US010356237B2

(12) United States Patent
Xu et al.

(10) Patent No.: US 10,356,237 B2
(45) Date of Patent: Jul. 16, 2019

(54) MOBILE TERMINAL, WEARABLE DEVICE, AND MESSAGE TRANSFER METHOD

(71) Applicant: Huawei Technologies Co., Ltd., Shenzhen, Guangdong (CN)

(72) Inventors: Zhe Xu, Shenzhen (CN); Huangwei Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/736,960

(22) PCT Filed: Feb. 29, 2016

(86) PCT No.: PCT/CN2016/074817
§ 371 (c)(1),
(2) Date: Dec. 15, 2017

(87) PCT Pub. No.: WO2017/147744
PCT Pub. Date: Sep. 8, 2017

(65) Prior Publication Data
US 2018/0375988 A1 Dec. 27, 2018

(51) Int. Cl.
*H04W 88/02* (2009.01)
*H04M 1/725* (2006.01)
(Continued)

(52) U.S. Cl.
CPC .......... *H04M 1/72561* (2013.01); *G06F 3/01* (2013.01); *H04M 1/7253* (2013.01);
(Continued)

(58) Field of Classification Search
CPC ........... H04M 1/72561; H04M 1/7253; H04M 1/72563; H04W 52/025; H04W 88/02; H04W 88/023; G06F 3/01
(Continued)

(56) References Cited

U.S. PATENT DOCUMENTS 7,016,707 B2 *  3/2006  Fujisawa ............. H04M 1/6505
                                                    340/573.1
7,116,438 B2 * 10/2006  Maeoka ............... G06Q 10/107
                                                      358/1.15
(Continued)

FOREIGN PATENT DOCUMENTS

CN    102982031 A    3/2013
CN    103092503 A    5/2013
(Continued)

*Primary Examiner* — Hai V Nguyen

(57) ABSTRACT

A mobile terminal includes: a receiver, configured to receive a first message including web page address information; a transmitter, configured to send a message notification to the wearable device; a processor, configured to record a first moment at which that the mobile terminal is used is detected, where the processor is configured to determine that a user has chosen to view the first message; the processor is configured to determine whether a time interval between a second moment and the first moment is less than a time interval threshold; and the receiver is further configured to obtain web page content when the time interval is less than the time interval threshold; and a display, configured to display the web page content. The mobile terminal obtains and displays the web page content only when the foregoing time interval requirement is satisfied.

14 Claims, 15 Drawing Sheets

(51) Int. Cl.
*G06F 3/01* (2006.01)
*H04W 52/02* (2009.01)
(52) U.S. Cl.
CPC ... *H04M 1/72563* (2013.01); *H04W 52/0251* (2013.01); *H04W 88/02* (2013.01); *H04W 88/023* (2013.01)
(58) Field of Classification Search
USPC ...................................................... 455/412.2
See application file for complete search history.

(56) References Cited

U.S. PATENT DOCUMENTS

| | | | | |
|---|---|---|---|---|
| 7,243,130 B2* | 7/2007 | Horvitz | G05B 19/404 | 709/206 |
| 7,376,412 B2* | 5/2008 | Kuramatsu | H04W 88/02 | 455/412.1 |
| 7,648,236 B1* | 1/2010 | Dobson | G02C 11/06 | 345/8 |
| 7,809,406 B2* | 10/2010 | Weinans | H04M 1/7253 | 370/315 |
| 8,279,182 B2 | 10/2012 | Kim et al. | | |
| 8,340,642 B2* | 12/2012 | Kuramatsu | H04W 88/02 | 455/412.1 |
| 8,644,702 B1* | 2/2014 | Kalajan | H04N 21/64784 | 396/429 |
| 8,838,713 B2* | 9/2014 | Moore | H04N 21/4333 | 455/412.2 |
| 8,923,804 B1* | 12/2014 | Aldridge, II | H04W 4/16 | 455/404.2 |
| 9,024,747 B1* | 5/2015 | Faaborg | G08B 5/22 | 340/527 |
| 9,047,600 B2* | 6/2015 | Zhou | G06Q 20/322 | |
| 9,173,074 B2* | 10/2015 | Miller | H04L 51/30 | |
| 9,402,167 B2* | 7/2016 | Barat | G06F 15/17312 | |
| 9,407,591 B2* | 8/2016 | Faaborg | H04L 51/04 | |
| 9,426,275 B2* | 8/2016 | Eim | G06F 1/163 | |
| 9,509,828 B2* | 11/2016 | Lee | H04M 1/7253 | |
| 9,591,433 B2* | 3/2017 | Lee | H04M 1/7253 | |
| 9,620,001 B2* | 4/2017 | Brunolli | G08C 17/02 | |
| 9,661,386 B2* | 5/2017 | Hampson | H04N 21/458 | |
| 9,832,638 B2* | 11/2017 | Cha | H04W 76/14 | |
| 9,832,753 B2* | 11/2017 | Barat | G06F 15/17312 | |
| 9,853,931 B2* | 12/2017 | Faaborg | H04L 51/04 | |
| 9,999,019 B2* | 6/2018 | Jeong | H04W 68/02 | |
| 10,000,217 B2* | 6/2018 | Kitagishi | H04W 4/029 | |
| 10,021,233 B2* | 7/2018 | Cho | G06F 9/542 | |
| 10,027,789 B2* | 7/2018 | Moran | H04M 1/72527 | |
| 10,039,503 B2* | 8/2018 | Domeika | H04W 4/80 | |
| 10,120,446 B2* | 11/2018 | Pance | G06F 3/016 | |
| 10,126,817 B2* | 11/2018 | Morrell | G06F 3/016 | |
| 10,185,429 B2* | 1/2019 | Won | H04M 1/7253 | |
| 2002/0115478 A1* | 8/2002 | Fujisawa | H04M 1/6505 | 455/567 |
| 2008/0174547 A1* | 7/2008 | Kanevsky | G06F 3/011 | 345/156 |
| 2013/0076509 A1* | 3/2013 | Ahn | A61F 13/42 | 340/539.12 |
| 2013/0244576 A1* | 9/2013 | Morohoshi | H04B 5/04 | 455/41.1 |
| 2014/0045463 A1* | 2/2014 | Hsieh | G06F 1/1643 | 455/411 |
| 2014/0045547 A1 | 2/2014 | Singamsetty et al. | | |
| 2014/0066024 A1* | 3/2014 | Lee | H04M 3/42042 | 455/412.2 |
| 2014/0171156 A1* | 6/2014 | Pattikonda | H04M 1/6041 | 455/569.1 |
| 2014/0206323 A1* | 7/2014 | Scorcioni | H04W 4/16 | 455/414.1 |
| 2014/0207833 A1* | 7/2014 | Xie | G06F 16/11 | 707/822 |
| 2014/0240122 A1* | 8/2014 | Roberts | G16H 40/63 | 340/539.11 |
| 2014/0298353 A1* | 10/2014 | Hsu | G06F 9/54 | 719/313 |
| 2015/0020081 A1* | 1/2015 | Cho | G06F 9/542 | 719/318 |
| 2015/0065055 A1* | 3/2015 | Newham | H04W 52/0251 | 455/41.3 |
| 2015/0067580 A1* | 3/2015 | Um | G06F 3/0481 | 715/781 |
| 2015/0123894 A1* | 5/2015 | Kim | G06F 3/017 | 345/156 |
| 2015/0147975 A1* | 5/2015 | Li | H04M 1/7253 | 455/41.3 |
| 2015/0163743 A1* | 6/2015 | Narasimha | H04W 52/0254 | 370/311 |
| 2015/0207916 A1* | 7/2015 | Xue | H04W 4/12 | 455/412.2 |
| 2015/0261387 A1* | 9/2015 | Petersen | G06F 3/013 | 715/765 |
| 2015/0269936 A1* | 9/2015 | Alameh | G10L 15/26 | 704/235 |
| 2015/0301574 A1* | 10/2015 | Kim | G06F 1/163 | 345/156 |
| 2015/0319806 A1* | 11/2015 | Li | H04W 88/184 | 455/412.2 |
| 2015/0341900 A1* | 11/2015 | Jeong | H04W 68/02 | 455/458 |
| 2015/0341903 A1 | 11/2015 | Jeong et al. | | |
| 2015/0350146 A1* | 12/2015 | Cary | H04W 4/90 | 709/206 |
| 2016/0034696 A1* | 2/2016 | Jooste | G06F 1/163 | 726/1 |
| 2016/0036953 A1* | 2/2016 | Lee | H04M 1/576 | 455/426.1 |
| 2016/0061613 A1* | 3/2016 | Jung | G01C 21/3632 | 701/49 |
| 2016/0065727 A1* | 3/2016 | Yeon | H04M 1/72597 | 455/556.1 |
| 2016/0085408 A1 | 3/2016 | Lang et al. | | |
| 2016/0105923 A1* | 4/2016 | Chen | H04W 76/14 | 455/41.2 |
| 2016/0110012 A1* | 4/2016 | Yim | G06F 1/1626 | 345/173 |
| 2016/0198322 A1* | 7/2016 | Pitis | H04W 4/18 | 455/420 |
| 2016/0301649 A1* | 10/2016 | Faaborg | H04L 51/04 | |
| 2016/0306504 A1* | 10/2016 | Brunsch | H04L 51/04 | |
| 2016/0358445 A1* | 12/2016 | Ishii | G09B 29/10 | |
| 2016/0360031 A1* | 12/2016 | Rauenbuehler | H04W 76/10 | |
| 2016/0379245 A1* | 12/2016 | Dey | G06Q 30/0246 | 705/14.45 |
| 2017/0041264 A1* | 2/2017 | Khomami Abadi | H04L 51/12 | |
| 2017/0048372 A1 | 2/2017 | Huang | | |
| 2017/0054669 A1* | 2/2017 | Lewis | H04L 51/24 | |
| 2017/0064071 A1* | 3/2017 | Won | H04M 1/7253 | |
| 2017/0085678 A1* | 3/2017 | Babu | H04L 67/36 | |
| 2017/0094484 A1* | 3/2017 | Li | H04L 51/24 | |
| 2017/0285788 A1* | 10/2017 | Park | H04L 67/06 | |
| 2018/0024629 A1* | 1/2018 | Wang | G06F 3/013 | 345/158 |
| 2018/0091465 A1* | 3/2018 | Faaborg | H04L 51/04 | |
| 2018/0092607 A1* | 4/2018 | Domeika | H04W 4/80 | |
| 2018/0343024 A1* | 11/2018 | Sahebjavaher | G06F 15/00 | |
| 2019/0046039 A1* | 2/2019 | Ramesh | A61B 5/0024 | |

FOREIGN PATENT DOCUMENTS

| | | |
|---|---|---|
| CN | 104267812 A | 1/2015 |
| CN | 104469663 A | 3/2015 |
| CN | 104572997 A | 4/2015 |
| CN | 104683568 A | 6/2015 |
| CN | 104836904 A | 8/2015 |
| CN | 105230114 A | 1/2016 |
| EP | 2811723 A1 | 12/2014 |
| WO | 2016110259 A1 | 7/2016 |

* cited by examiner

MOBILE TERMINAL, WEARABLE DEVICE, AND MESSAGE TRANSFER METHOD

CROSS-REFERENCE TO RELATED APPLICATIONS

This application is a national stage of International Application No. PCT/CN2016/074817, filed on Feb. 29, 2016, which is hereby incorporated by reference in its entirety.

TECHNICAL FIELD

This application relates to the field of terminal technologies, and in particular, to a mobile terminal, a wearable device, and a message transfer method.

BACKGROUND

A wearable device may be paired with another existing terminal and access information by using the terminal. However, the existing wearable device has a screen with a limited size for better portability, and therefore is not suitable to display complex user interface (User Interface, UI) components or a web page on which there is a large quantity of text information and/or pictures, such as a Hypertext Markup Language (Hyper Text Mark-up Language, HTML) page.

Currently, a user receives a notification of a message on a wearable device, and may further view detailed content of the message on a mobile phone. This process includes the following content: After seeing a notification of a message on a wearable device (for example, a smartwatch), a user taps a button "Open on the mobile phone" on the smartwatch, and performs an operation on the mobile phone to view detailed content of the message corresponding to the message notification seen on the smartwatch.

In another implementation, when a user sees a notification of a message on a wearable device (for example, a smartwatch), and the message notification includes web page address information (for example, a web page link), the user flicks on the smartwatch, taps a button "Open on the mobile phone", and then can view a web page on the mobile phone.

In the foregoing implementations, whether the user can view the message on the mobile phone in a timely manner is not considered, easily causing a waste of power and data traffic of the mobile phone.

SUMMARY

In view of this, this application provides a mobile terminal, a wearable device, and a message transfer method, so as to reduce a waste of power and data traffic of a mobile phone and also meet a user's requirement of viewing a web page on the mobile phone.

According to a first aspect, this application provides a message transfer method.

In the method, a mobile terminal receives, from a server or another terminal, a first message including web page address information, and sends a message notification including the web page address information to a wearable device paired with the mobile terminal;

after receiving the message notification, the wearable device displays the message notification on a display screen of the wearable device;

after detecting that a user chooses, according to the message notification, to view the first message, the wearable device sends a message view indication including an identification of the first message to the mobile terminal;

after receiving the message view indication, the mobile terminal determines that the user has chosen, according to the message notification, to view the first message;

in addition, the mobile terminal further needs to detect that the mobile terminal is used and record a first moment at which that the mobile terminal is used is detected; and when a time interval between a second moment at which the user chooses, according to the message notification, to view the first message and the first moment is less than a time interval threshold, the mobile terminal obtains web page content corresponding to the web page address information and displays the web page content.

In the method, the mobile terminal obtains and displays the web page content only when the time interval between the second moment and the first moment is less than the time interval threshold. On the one hand, the user can view the web page content on the mobile terminal after the user uses the mobile terminal. On the other hand, this can avoid a waste of power and data traffic of the mobile terminal caused because the mobile terminal still obtains the web page content when the user does not use the mobile terminal for a long time.

In an optional implementation, the message notification sent by the mobile terminal includes the identification of the first message. After receiving the message notification, the wearable device obtains the identification of the first message from the message notification; and after detecting that the user chooses, according to the message notification, to view the first message, the wearable device sends the message view indication including the identification of the first message to the mobile terminal, so that when the message view indication received by the mobile terminal includes the identification of the first message, the mobile terminal can determine that the user has chosen, according to the message notification, to view the first message.

The mobile terminal adds the identification of the first message in the message notification. Therefore, when finding the identification of the first message in the message view indication, the mobile terminal can determine that the user has chosen, according to the message notification, to view the first message. A method for determining, by the mobile terminal, that the user chooses to view the first message is provided.

In an optional implementation, after detecting that the mobile terminal is used and before receiving the message view indication, the mobile terminal sends a first query message including the identification of the first message to the wearable device; and after receiving the first query message and if determining that the user has chosen to view the first message, the wearable device sends the message view indication to the mobile terminal according to the first query message.

After detecting that the mobile terminal is used, the mobile terminal sends the first query message to the wearable device, to proactively query that the user has chosen to view the first message. After receiving the first query message and if determining that the user has chosen to view the first message, the wearable device sends the message view indication, so that the mobile terminal can learn that the user has chosen to view the first message. A method for learning, by the mobile terminal, that the user has chosen to view the first message is provided.

In an optional implementation, the mobile terminal records a moment at which the message view indication is received, and uses the moment at which the mobile terminal receives the message view indication, as the second moment.

A method for determining the second moment by the mobile terminal is provided.

In an optional implementation, when the wearable device sends the message view indication, the message view indication further includes a moment at which the wearable device detects that the user chooses to view the first message. After receiving the message view indication, the mobile terminal uses the moment that is included in the message view indication and at which the wearable device detects that the user chooses to view the first message, as the second moment.

The wearable device explicitly adds, to the message view indication, the moment at which the wearable device detects that the user chooses to view the first message, and the mobile terminal uses the moment included in the message view indication, as the second moment. A method for learning the second moment by the mobile terminal is provided.

In an optional implementation, after detecting that mobile terminal is used, the mobile terminal sends a second query message to the wearable device, where the second query message includes information about the first moment; after receiving the second query message, the wearable device determines the first moment according to the information about the first moment;

when detecting that the user chooses, according to the message notification, to view the first message, the wearable device records the second moment at which that the user chooses to view the first message is detected;

when determining that the time interval between the first moment and the second moment is less than the time interval threshold, the wearable device sends the message view indication including the identification of the first message to the mobile terminal; and after receiving the message view indication including the identification of the first message, the mobile terminal learns a result that the time interval between the first moment and the second moment is less than the time interval threshold.

The mobile terminal notifies the wearable device of the first moment, and the wearable device determines whether the time interval between the first moment and the second moment is less than the time interval threshold. If the time interval is less than the time interval threshold, the wearable device notifies the mobile terminal of the result that whether the time interval between the first moment and the second moment is less than the time interval threshold. A method for determining, by the mobile terminal, that the time interval between the first moment and the second moment is less than the time interval threshold is provided.

According to a second aspect, this application provides a mobile terminal. The mobile terminal has functions of implementing operations of the mobile terminal in the foregoing method. The functions may be implemented by using hardware, or may be implemented by hardware executing corresponding software. The hardware or software includes one or more modules corresponding to the foregoing functions.

In an optional implementation solution, a structure of the mobile terminal includes a receiver, a transmitter, a processor, and a display.

The processor is configured to support the mobile terminal in implementing corresponding functions in the foregoing method.

The transmitter is configured to support the mobile terminal in sending a request for obtaining web page content to an application server and sending a notification message, a query message, and the like to a wearable device.

The receiver is configured to support the mobile terminal in receiving a first message, receiving the web page content from the application server, and receiving a message view indication and the like from the wearable device.

The display is configured to support the mobile terminal in displaying the web page content.

The mobile terminal may further include a memory. The memory is configured to be coupled with the processor and stores a necessary program instruction and necessary data for the mobile terminal.

According to a third aspect, this application provides a wearable device. The wearable device has functions of implementing operations of the wearable device in the foregoing method. The functions may be implemented by using hardware, or may be implemented by hardware executing corresponding software. The hardware or software includes one or more modules corresponding to the foregoing functions.

In an optional implementation solution, a structure of the wearable device includes a receiver, a transmitter, a processor, and a display.

The processor is configured to support the wearable device in implementing corresponding functions in the foregoing method.

The transmitter is configured to support the wearable device in sending a message view indication to a mobile terminal.

The receiver is configured to support the wearable device in receiving a message notification, a query message, and the like from the mobile terminal.

The display is configured to support the wearable device in displaying the message notification.

The wearable device may further include a memory. The memory is configured to be coupled with the processor and stores a necessary program instruction and necessary data for the wearable device.

According to a fourth aspect, this application provides a computer storage medium, configured to store a computer software instruction used by the mobile terminal according to any one of the first to the third aspects. The computer software instruction includes a program designed for executing the foregoing aspects.

According to a fifth aspect, this application provides a computer storage medium, configured to store a computer software instruction used by the wearable device according to any one of the first to the third aspects. The computer software instruction includes a program designed for executing the foregoing aspects.

According to a sixth aspect, this application provides a message transfer method.

In the method, a wearable device receives, from a server or another terminal, a first message including web page address information;

when detecting that a user chooses to view the first message, the wearable device records a second moment at which that the user chooses to view the first message is detected, and sends the first message and a message view indication to a mobile terminal, where the message view indication includes an identification of the first message, and the first message includes the web page address information;

the mobile terminal receives the first message and the message view indication from the wearable device, and determines, according to the message view indication, that the user has chosen to view the first message;

the mobile terminal determines the second moment at which the wearable device detects that the user chooses, according to the message notification, to view the first message;

the mobile terminal detects that the mobile terminal is used, and records a first moment at which that the mobile terminal is used is detected; and when determining that a time interval between the second moment and the first moment is less than a time interval threshold, the mobile terminal obtains the web page content, and displays the web page content.

In the method, the mobile terminal obtains and displays the web page content only when the time interval between the second moment and the first moment is less than the time interval threshold. On the one hand, the user can view the web page content on the mobile terminal after the user uses the mobile terminal. On the other hand, this can avoid a waste of power and data traffic of the mobile terminal caused because the mobile terminal still obtains the web page content when the user does not use the mobile terminal for a long time.

In the method, the wearable device receives the first message from the server or the another terminal, and when determining that the user has chosen to view the first message, sends the first message and the message view indication to the mobile terminal. In the method of the first aspect, the mobile terminal receives the first message from the server or the another terminal, and then provides the notification for the wearable device.

In an optional implementation, the wearable device sends information about the second moment to the mobile terminal, and the mobile terminal determines the second moment according to the information. The information about the second moment may be included in the message view indication and the message view indication is sent to the mobile terminal.

In an optional implementation, the mobile terminal uses a moment at which the mobile terminal receives the message view indication, as the second moment.

The foregoing two optional implementations provide methods for determining the second moment by the mobile terminal.

According to a seventh aspect, this application provides a mobile terminal. The mobile terminal has functions of implementing operations of the mobile terminal in the method provided in the sixth aspect. The functions may be implemented by using hardware, or may be implemented by hardware executing corresponding software. The hardware or software includes one or more modules corresponding to the foregoing functions.

In an optional implementation solution, a structure of the mobile terminal includes a receiver, a transmitter, a processor, and a display.

The processor is configured to support the mobile terminal in implementing corresponding functions in the foregoing method.

The transmitter is configured to support the mobile terminal in sending a request for obtaining web page content to an application server and sending a query message and the like to a wearable device.

The receiver is configured to support the mobile terminal in receiving a first message, a message view indication, and the like and receiving the web page content from the application server.

The display is configured to support the mobile terminal in displaying the web page content.

The mobile terminal may further include a memory. The memory is configured to be coupled with the processor and stores a necessary program instruction and necessary data for the mobile terminal.

According to an eighth aspect, this application provides a wearable device. The wearable device has functions of implementing operations of the wearable device in the method provided in the sixth aspect. The functions may be implemented by using hardware, or may be implemented by hardware executing corresponding software. The hardware or software includes one or more modules corresponding to the foregoing functions.

In an optional implementation solution, a structure of the wearable device includes a receiver, a transmitter, a processor, and a display.

The processor is configured to support the wearable device in implementing corresponding functions in the foregoing method.

The transmitter is configured to support the wearable device in sending a message view indication, a first message, and the like to a mobile terminal.

The receiver is configured to support the wearable device in receiving a query message from the mobile terminal and receiving the first message from a server or another terminal, and the like.

The display is configured to support the wearable device in displaying a message notification.

The wearable device may further include a memory. The memory is configured to be coupled with the processor and stores a necessary program instruction and necessary data for the wearable device.

According to a ninth aspect, this application provides a computer storage medium, configured to store a computer software instruction used by the mobile terminal according to any one of the sixth to the eighth aspects. The computer software instruction includes a program designed for executing the foregoing aspects.

According to a tenth aspect, this application provides a computer storage medium, configured to store a computer software instruction used by the wearable device according to any one of the sixth to the eighth aspects. The computer software instruction includes a program designed for executing the foregoing aspects.

According to an eleventh aspect, this application provides a message transfer method.

In the method, a mobile terminal receives, from a server or another terminal, a first message including web page address information;

the mobile terminal sends a message notification to a wearable device bound to the mobile terminal, where the message notification includes the web page address information and an identification of the first message;

the wearable device displays the message notification on a display screen of the wearable device;

the wearable device detects that a user has chosen, according to the message notification, to view the first message, and sends a message view indication including the identification of the first message to the mobile terminal;

when receiving the message view indication from the wearable device, where the message view indication includes the identification of the first message, and when determining, according to the message view indication, that the user has chosen, according to the message notification, to view the first message, the mobile terminal obtains web page content corresponding to the web page address information, and changes the obtained web page content, so that the changed content is suitable to be displayed on the display screen of the wearable device;

the mobile terminal sends the changed web page content to the wearable device; and the wearable device displays the changed web page content on the display screen.

The mobile terminal obtains the web page content after determining that the user has chosen to view the first message. In consideration of features of the display screen of the wearable device, the mobile terminal changes the obtained web page content, and sends the changed web page content to the wearable device, so that the web page content can be suitable to be displayed on the display screen of the wearable device.

According to a twelfth aspect, this application provides a mobile terminal. The mobile terminal has functions of implementing operations of the mobile terminal in the foregoing method. The functions may be implemented by using hardware, or may be implemented by hardware executing corresponding software. The hardware or software includes one or more modules corresponding to the foregoing functions.

In an optional implementation solution, a structure of the mobile terminal includes a receiver, a transmitter, and a processor.

The processor is configured to support the mobile terminal in implementing corresponding functions in the foregoing method.

The transmitter is configured to support the mobile terminal in sending a request for obtaining web page content to an application server and sending a notification message, the changed web page content, and the like to a wearable device.

The receiver is configured to support the mobile terminal in receiving a first message, receiving the web page content from the application server, and receiving a message view indication and the like from the wearable device.

The mobile terminal may further include a memory. The memory is configured to be coupled with the processor and stores a necessary program instruction and necessary data for the mobile terminal.

According to a thirteenth aspect, this application provides a wearable device. The wearable device has functions of implementing operations of the wearable device in the foregoing method. The functions may be implemented by using hardware, or may be implemented by hardware executing corresponding software. The hardware or software includes one or more modules corresponding to the foregoing functions.

In an optional implementation solution, a structure of the wearable device includes a receiver, a transmitter, a processor, and a display.

The processor is configured to support the wearable device in implementing corresponding functions in the foregoing method.

The transmitter is configured to support the wearable device in sending a message view indication to a mobile terminal.

The receiver is configured to support the wearable device in receiving a message notification, web page content, and the like from the mobile terminal.

The display is configured to support the wearable device in displaying the message notification, the web page content, and the like.

The wearable device may further include a memory. The memory is configured to be coupled with the processor and stores a necessary program instruction and necessary data for the wearable device.

According to a fourteenth aspect, this application provides a computer storage medium, configured to store a computer software instruction used by the mobile terminal according to any one of the eleventh to the thirteenth aspects. The computer software instruction includes a program designed for executing the foregoing aspects.

According to a fifteenth aspect, this application provides a computer storage medium, configured to store a computer software instruction used by the wearable device according to any one of the eleventh to the thirteenth aspects. The computer software instruction includes a program designed for executing the foregoing aspects.

DESCRIPTION OF EMBODIMENTS

To make the objectives, technical solutions, and advantages of this application more understandable, the following provides detailed descriptions. The detailed descriptions provide various implementations of a device and/or a method by using block diagrams, flowcharts, other accompany drawings, and/or examples. These block diagrams, flowcharts, and/or examples include one or more functions and/or operations. Persons in the art may understand that each function and/or operation in the block diagrams, the flowcharts, and/or the examples can be performed independently and/or jointly by using various hardware, software, and firmware, and/or any combination thereof.

To make this application more understandable, the following explains some common descriptions in the embodiments of this application. It should be noted that these explanations shall not be considered as a limitation to the required protection scope of this application.

1. Terminal

In the embodiments of this application, the terminal includes a mobile terminal and a wearable device, and may be a device providing voice and/or data connectivity for a user, a handheld device with a wireless connection function, or another processing device that is connected to a wireless modem, such as a mobile phone (or referred to as "cellular" phone), or may be a portable, a pocket-sized, a handheld, a computer built-in, or an in-vehicle mobile apparatus.

In the embodiments of this application, the mobile terminal may communicate with the wearable device, and a communications standard that may be used includes but is not limited to various near field communications standards such as Bluetooth, Near Field Communication (Near Field Communication, NFC), ZigBee, Infrared Data Association (Infrared Data Association, IrDA), and Wireless Fidelity (Wireless Fidelity, WiFi). Alternatively, the mobile terminal and the wearable device may use a communications standard used when the foregoing terminal communicates with a network device. In a future evolved 5th Generation (5th Generation, 5G) mobile communications system, terminals may communicate with each other in a cellular network-based device to device (Device to Device, D2D) manner. Any standard may be used provided that it can implement communication between two terminals.

2. Mobile Terminal

In the embodiments of this application, an example of the mobile terminal is a smartphone. Optionally, the smartphone has a relatively large display screen, such as a 2.4 inch, 3.1 inch, 4 inch, 5.5 inch, or 6 inch display screen. The mobile terminal may alternatively be a tablet computer, a PDA (Personal Digital Assistant, personal digital assistant), a POS (Point of Sales, point of sales), an in-vehicle computer, or the like.

Figure 1:
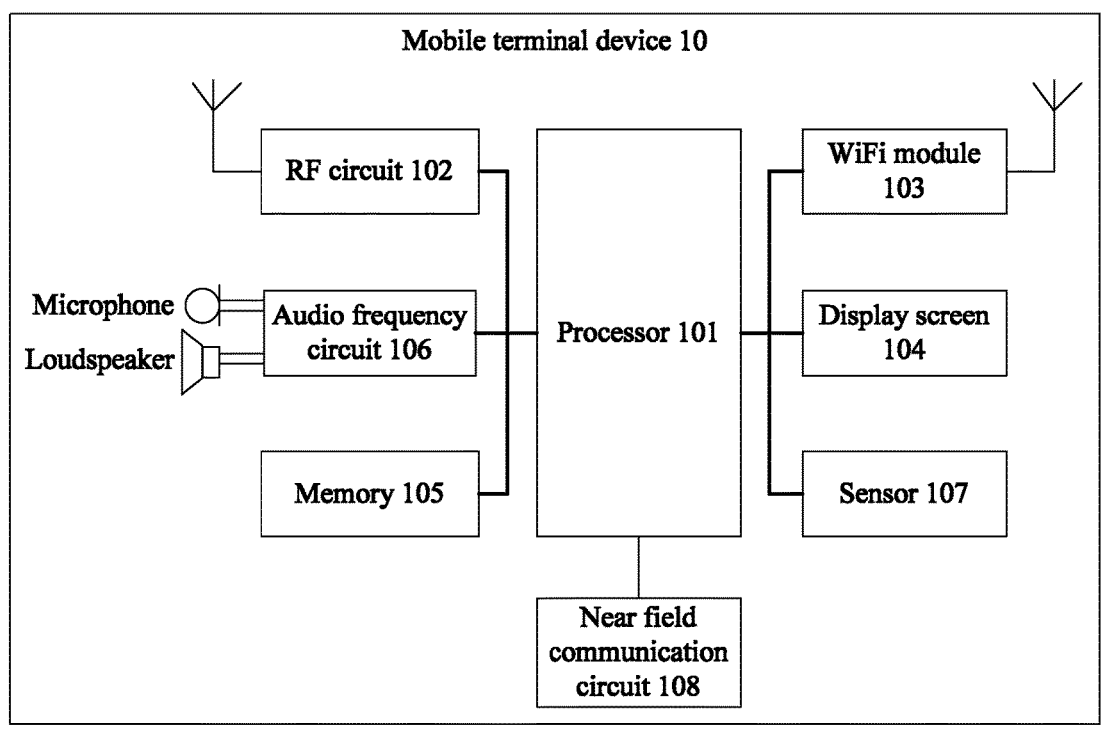
FIG. 1 is a schematic structural diagram of a mobile terminal according to an embodiment of this application.

FIG. 1 is a schematic structural diagram of optional hardware of a mobile terminal 10.

As shown in FIG. 1, the mobile terminal 10 may include a processor 101, a radio frequency (Radio Frequency, RF) circuit 102, a WiFi module 103, a display screen 104, a memory 105, an audio frequency circuit 106, a microphone and a loudspeaker that are connected to the audio frequency circuit 106, a sensor 107, a near field communication circuit 108, and the like.

The processor 101 may implement a processing and control function, and control other components and units of the mobile terminal 10. The processor 101 may invoke a program from the memory 105, so as to control work of the other components and units. The processor 101 may include one or more general purpose processors, or may include one or more digital signal processors (Digital Signal Processor, DSP).

The RF circuit 102 or the WiFi module 103 receives and transmits a radio signal. The mobile terminal 10 may access a server or another terminal by using the RF circuit 102 or the WiFi module 103, and obtain data from the server or the another terminal, for example, access an application server on the Internet and obtain data from the application server.

In addition, the mobile terminal 10 may communicate with a wearable device 20 by using the RF circuit 102 or the WiFi module 103.

When the RF circuit 102 receives and transmits a radio signal, a communications standard that may be used includes but is not limited to Global System for Mobile Communications (Global System of Mobile communication, GSM), Code Division Multiple Access (Code Division Multiple Access, CDMA) IS-95, Code Division Multiple Access (Code Division Multiple Access, CDMA) 2000, Time Division-Synchronous Code Division Multiple Access (Time Division-Synchronous Code Division Multiple Access, TD-SCDMA), Wideband Code Division Multiple Access (Wideband Code Division Multiple Access, WCDMA), Time Division Duplex-Long Term Evolution (Time Division Duplexing-Long Term Evolution, TDD LTE), Frequency Division Duplex-Long Term Evolution (Frequency Division Duplexing-Long Term Evolution, FDD LTE), Long Term Evolution-Advanced (Long Term Evolution-Advanced, LTE-advanced), Personal Handy-phone System (Personal Handy-phone System, PHS), Worldwide Interoperability for Microwave Access (Worldwide Interoperability for Microwave Access, WiMAX), and various future evolved wireless communications standards.

When the WiFi module 103 receives or transmits a signal, a WiFi communications standard stipulated in the 802.11 series protocols may be used.

The near field communication circuit 108 may receive and transmit a radio signal. The mobile terminal 10 may also perform, by using the near field communication circuit 108, near field communication with the wearable device 20 shown in FIG. 2.

The audio frequency circuit 106, the loudspeaker, and the microphone may provide an audio interface between a user and the mobile terminal 10. Optionally, in the embodiments of the present invention, the audio frequency circuit 106 and the loudspeaker are configured to make a sound, so as to instruct the user to use the mobile terminal 10.

The memory 105 may be configured to store a program. The stored program may be used to control the foregoing units and components. In addition, the memory 105 may store intermediate variable data and the like that are generated during running of the processor 101.

The display screen 104 is configured to display image data generated by the processor 101. Optionally, the display screen 104 may have a touch control function. In this case, the display screen 104 is a touch display screen, and is configured to receive a screen touch operation of the user and provide input operation information of the user for the processor 101.

The sensor 107 may be configured to determine a motion status of the mobile terminal 10, and may sense an arm movement of the user such as turning of a wrist, rotation of an arm, or raising of an arm. The sensor 107 may be an inertial sensor unit. The sensor 107 may include one or more sensors of an acceleration sensor, a gyroscope sensor, or a magnetic field sensor, or may include another type of sensor.

3. Wearable Device

In the embodiments of this application, an example of the wearable device may include but not limited to a smart band, a smartwatch, a wristband, or another wearable device. Optionally, the wearable device has a relatively small display screen, such as a 1.5 inch or 1.73 inch display screen.

Figure 2:
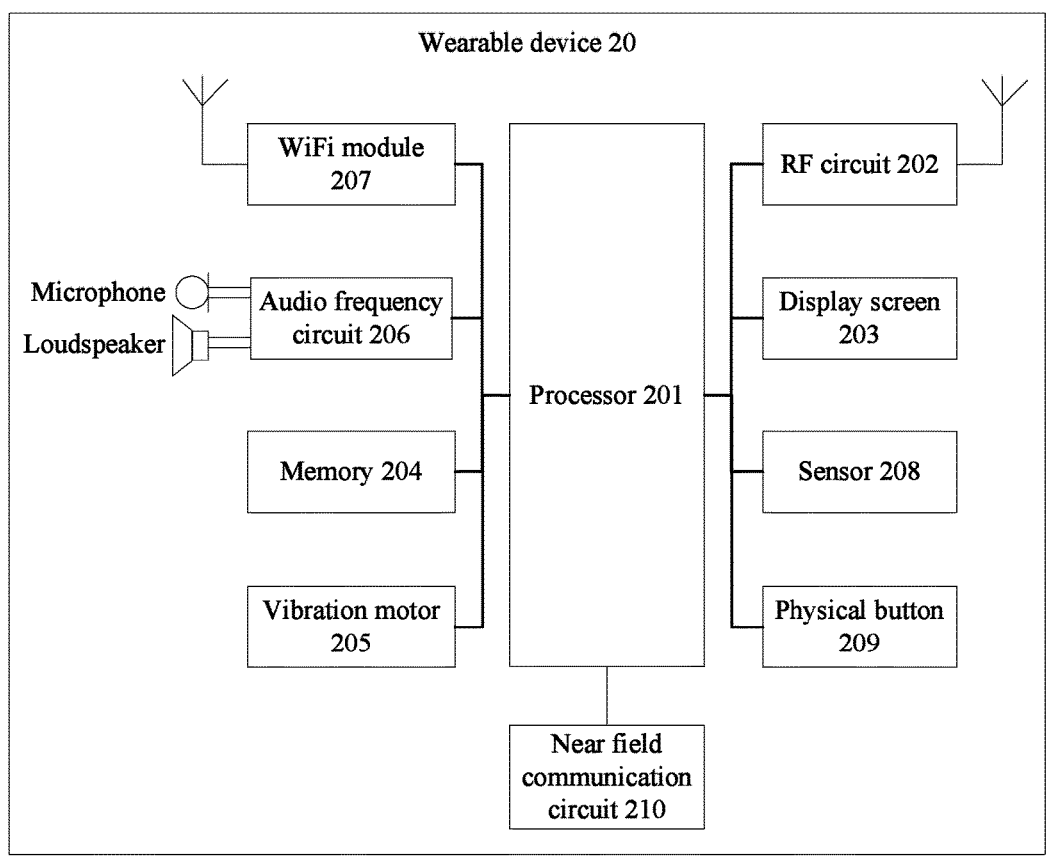
FIG. 2 is a schematic structural diagram of a wearable device according to an embodiment of this application.

FIG. 2 is a schematic structural diagram of optional hardware of the wearable device 20.

As shown in FIG. 2, the wearable device 20 may include a processor 201, an RF circuit 202 or a WiFi module 207, a display screen 203, a memory 204, a vibration motor 205, an audio frequency circuit 206, a microphone and a loudspeaker that are connected to the audio frequency circuit 206, a sensor 208, a physical button 209, a near field communication circuit 210, and the like. The physical button 209 may include one or more buttons.

The processor 201 may implement a processing and control function, and control other components and units of the wearable device 20. The processor 201 may invoke a program from the memory 204, so as to control work of the other components and units. The processor 201 may include one or more general purpose processors, or may include one or more DSPs.

The near field communication circuit 210 may receive and transmit a radio signal, and perform near field communication with the mobile terminal 10.

The RF circuit 202 or the WiFi module 207 may receive and transmit a radio signal. The wearable device 20 may communicate with a server or another terminal by using the RF circuit 202 or the WiFi module 207, for example, access an application server on the Internet and obtain data from the application server.

The wearable device 20 may also communicate with the mobile terminal 10 by using the RF circuit 102 or the WiFi module 103, for example, by means of D2D communication described above.

When the RF circuit 202 receives and transmits a radio signal, a communications standard that may be used includes but is not limited to Global System for Mobile Communications (Global System of Mobile communication, GSM), Code Division Multiple Access (Code Division Multiple Access, CDMA) IS-95, Code Division Multiple Access (Code Division Multiple Access, CDMA) 2000, Time Division-Synchronous Code Division Multiple Access (Time Division-Synchronous Code Division Multiple Access, TD-SCDMA), Wideband Code Division Multiple Access (Wideband Code Division Multiple Access, WCDMA), Time Division Duplex-Long Term Evolution (Time Division Duplexing-Long Term Evolution, TDD LTE), Frequency Division Duplex-Long Term Evolution (Frequency Division Duplexing-Long Term Evolution, FDD LTE), Long Term Evolution-Advanced (Long Term Evolution-Advanced, LTE-advanced), Personal Handy-phone System (Personal Handy-phone System, PHS), Worldwide Interoperability for Microwave Access (Worldwide Interoperability for Microwave Access, WiMAX), and various future evolved wireless communications standards.

When the WiFi module 207 receives and transmits a radio signal, a WiFi wireless communications standard stipulated in the 802.11 series protocols may be used.

The audio frequency circuit 206, the loudspeaker, and the microphone may provide an audio interface between a user and the wearable device 20. Optionally, in the embodiments of the present invention, the audio frequency circuit 206 and the loudspeaker may be configured to make a sound, so as to notify the user of arrival of a message notification. The audio frequency circuit 206 and the microphone may also be configured to receive audio input of the user. For example, after the message notification is displayed on the wearable device 20, if the user gives an audio instruction of choosing to view a first message, the audio instruction of the user may be received by using the audio frequency circuit 206 and the microphone.

The memory 204 may be configured to store a program. The stored program may be used to control the foregoing units and components. In addition, the memory 204 may store intermediate variable data and the like that are generated during running of the processor 201.

The display screen 203 is configured to display image data generated by the processor 201. Optionally, the display screen 203 may have a touch control function. In this case, the display screen 203 is a touch display screen, and is configured to receive a screen touch operation of the user and provide input operation information of the user for the processor 201.

The sensor 208 may be configured to determine a motion status of the wearable device 20, and may sense an arm movement of the user such as turning of a wrist, rotation of an arm, or raising of an arm. The sensor 208 may be an inertial sensor unit. The sensor 208 may include one or more sensors of an acceleration sensor, a gyroscope sensor, or a magnetic field sensor, or may include another type of sensor.

The vibration motor 205 may vibrate under the control of a control instruction from the processor 201, and is configured to notify the user of happening of an event such as receiving of a notification message or calendar alarm reminding.

The physical button 209 may be configured to: receive a user's input operation such as selecting an option displayed on a screen, and send information about the user's input operation to the processor 201 for processing by the processor 201.

3. Pairing Between a Mobile Terminal and a Wearable Device

The mobile terminal 10 and the wearable device 20 may perform pairing with each other, for example, perform pairing by means of near field communication described above. For example, the mobile terminal 10 and the wearable device 20 perform a series of signaling exchange of device identification, a device type, and the like information. For these signaling exchange procedures, reference may be made to a current procedure of pairing the mobile terminal and the wearable device. This is not limited in the present invention. After the two terminals are paired, the two terminals may perform data transmission between each other, for example, transmission of data in various formats including pictures, texts, characters, images, data streams, and the like.

For example, if the mobile terminal 10 and the wearable device 20 use an Android (Android) operating system, an Android wear app (Android Wear App) on the mobile terminal 10 may be used to set pairing with the wearable device 20, and after the wearable device 20 is started and initialized, the wearable device 20 directly enters a pairing setting procedure to be paired with the mobile terminal 10.

For another example, if the mobile terminal 10 and the wearable device 20 use an iOS operating system, and the wearable device 20 is a smartwatch, a watch app (Watch App) on the mobile terminal 10 may be used to set pairing with the wearable device 20, and after the wearable device 20 is started and initialized, the wearable device 20 directly enters a pairing setting procedure to be paired with the mobile terminal 10.

After the mobile terminal 10 and the wearable device 20 are paired, the wearable device 20 may receive a message and/or data from the mobile terminal 10.

5. Web Page and Web Page Address Information

The web page may include an HTML page, an extensible Hypertext Markup Language (xHTML) page, Java server pages (Java Server Pages, JSP), a Wireless Application Protocol (Wireless Application Protocol, WAP) page, or the like.

The web page address information is information about a web page address and may be used to indicate a location and an access method of a web page. For example, the web page address information is a uniform resource locator (Uniform Resource Locator, URL) link, a uniform resource identifier (Uniform Resource Identifier, URI), or an Internet Protocol (Internet Protocol, IP) address plus a port number.

6. Message and Message Notification

In the embodiments of this application, a message is transferred between the mobile terminal 10 and the wearable device 20, displayed on the wearable device 20, and notified to the wearable device 20.

The message may be a text message such as a short message, a WeChat message, or a system notification message. Optionally, the message may include the web page address information, for example, a URL link. When the user clicks the link on a display screen, a web page corresponding to the URL link may be displayed on the display screen.

In some embodiments of this application, after receiving a first message, the mobile terminal 10 sends a message notification to the wearable device 20. The message notification includes web page address information that needs to be shown by the first message.

The wearable device 20 may display the message notification on the display screen 203, for example, one or more of the following information:

a content summary of the first message;
an application icon corresponding to the first message;
an application name corresponding to the first message;
the web page address information;
information about a sending party of the first message (such as a server name or another terminal name); or
the first several characters in a main body of the first message.

7. First Moment, Second Moment, and Time Interval Threshold

In some embodiments of this application, the mobile terminal 10 needs to perform time interval determining. If a time interval between a moment at which the user chooses to view the first message and a moment at which that the mobile terminal 10 is used is detected is less than a time interval threshold, the mobile terminal 10 displays the first message on the display screen 104.

For clear and concise description, the moment at which that the mobile terminal 10 is used is detected is marked as a "first moment", and the moment at which that the user chooses to view the first message is marked as a "second moment".

The time interval threshold may be a preset duration value, for example, 10 s, 30 s, and 60 s, or may be determined by the processor 101 according to a distance between the mobile terminal 10 and the wearable device 20. A longer distance indicates a higher time interval threshold. Alternatively, the time interval threshold may be determined according to a user's operation habit. For example, the user usually picks up the mobile terminal 10 within 5 s after a notification is received on the wearable device 20, and in this case, the time interval threshold may be set to 5 s.

In the following, a message transfer procedure provided in an embodiment of this application is described in detail with reference to an accompanying drawing.

Figure 3:
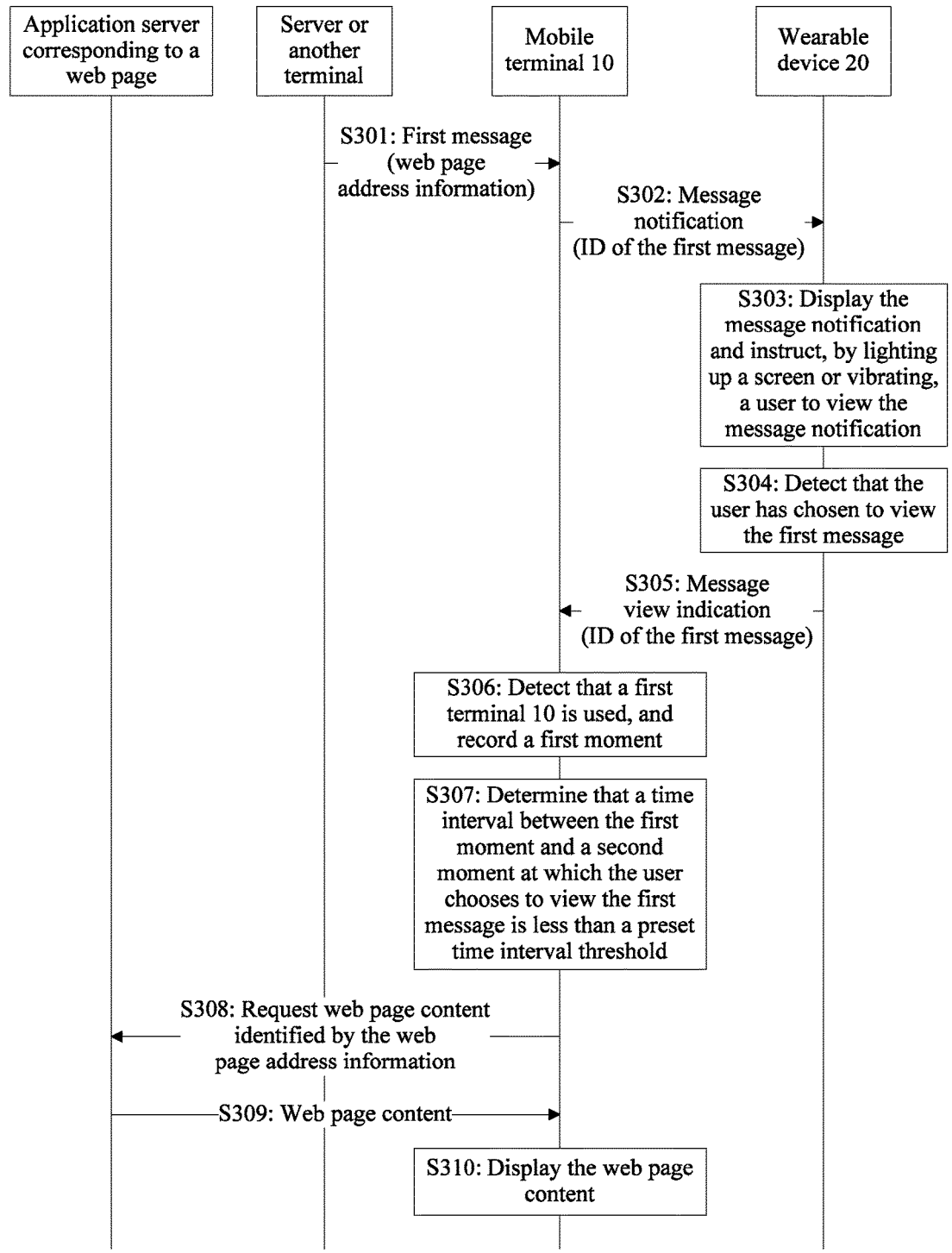
FIG. 3 is a flowchart 1 of a message transfer procedure according to an embodiment of this application.

FIG. 3 is a flowchart 1 of a message transfer procedure according to an embodiment of this application. As shown in FIG. 3, the procedure includes the following steps.

S301: The mobile terminal 10 receives a first message from a server or another terminal.

Optionally, the first message includes the foregoing web page address information.

Optionally, the first terminal 10 may receive the first message by using the RF circuit 102 or the WiFi module 103. After receiving the first message, the RF circuit 102 or the WiFi module 103 sends the first message to the processor 101 for processing.

S302: After receiving the first message, the mobile terminal 10 generates a message notification, where the message notification is used to notify arrival of the first message, and the mobile terminal 10 sends the message notification to the wearable device 20 paired with the mobile terminal 10.

Optionally, the message notification includes an identification (identification, ID) of the first message. After receiving the message notification, the wearable device 20 determines arrival of the first message according to the identification of the first message in the message notification.

Optionally, after receiving the first message, the processor 101 generates the message notification and sends the generated message notification to the wearable device 20 by using the near field communication circuit 108.

Before the mobile terminal 10 sends the message notification to the wearable device 20, the mobile terminal 10 may be paired with the wearable device 20 in the foregoing manner. The implementation may be: The near field communication circuit 108 of the mobile terminal 10 is paired with the near field communication circuit 210 of the wearable device 20.

S303: After receiving the message notification, the wearable device 20 instructs, by lighting up a screen, vibrating, or making a sound, a user to view the message notification.

The wearable device 20 receives the message notification by using the near field communication circuit 210. The near field communication circuit 210 sends the received message notification to the processor 201 of the wearable device 20. After receiving the message notification, the processor 201 obtains the ID of the first message from the message notification, saves the ID of the first message in the memory 204, and additionally controls the display screen 203 to display the message notification, for example, display a content summary of the first message, an application icon corresponding to the first message, and/or a name of an application for sending the first message.

The processor 201 of the wearable device 20 may further instruct, in one or more of the following manners, the user to view the message notification:

controlling the display screen 203 to be lighted up; controlling the vibration motor 205 to vibrate; or controlling the audio frequency circuit 206 to make a sound prompt by using the loudspeaker.

S304: The wearable device 20 detects whether the user has chosen to view the first message, and if it is detected that the user has chosen to view the first message, step S305 is performed.

When satisfying one or more of the following conditions, the processor 201 of the wearable device 20 may determine that the processor 201 of the wearable device 20 detects that the user has chosen to view the first message:

condition 1: detecting that the user clicks, on the display screen 203 of the wearable device 20, an item corresponding to the message notification (the display screen 203 is a touch display screen);

condition 2: detecting that duration for displaying, on the display screen 203, an item corresponding to the message notification exceeds a preset display duration threshold;

condition 3: detecting that duration for which the user stays at the message notification exceeds a preset stay duration threshold in a process in which the user scrolls through a notification list on the display screen 203 (touch display screen);

condition 4: detecting that the user selects the message notification in a notification list by using the physical button 209;

condition 5: detecting that a pressure generated when the user presses an item corresponding to the message notification in a notification list displayed on the display screen 203 (touch display screen) exceeds a preset pressure threshold;

condition 6: detecting that the user has performed a preset action on an item corresponding to the message notification in a notification list displayed on the display screen 203 (touch display screen), for example, has performed an operation on the message notification according to a preset gesture, for example, has clicked or slid the message notification on the display screen 203 in a preset pattern;

condition 7: if the second terminal device 20 is a smartwatch, and the smartwatch has a built-in inertial sensor, when the inertial sensor senses that an arm on which the smartwatch is worn has performed a preset action, such as turning a wrist, raising the arm, swinging the arm, and shaking the arm, the processor 201 determines that condition 7 is satisfied; or condition 8: detecting, by using the audio frequency circuit 206 and the microphone, that the user gives a sound instruction, where the sound instruction is used to instruct the user to choose to view the first message.

Optionally, the processor 201 of the wearable device 20 records the ID of the first message in the memory 204 of the wearable device 20, indicating that the user has chosen to view the first message. Optionally, in the following manner 2 and manner 3 of sending a message view indication by the wearable device 20, the processor 201 may further record, in the memory 204, information about a second moment at which the user chooses to view the first message.

S305: The wearable device 20 sends a message view indication to the mobile terminal 10.

Optionally, after the wearable device 20 receives the message notification, if the message notification includes the ID of the first message, the wearable device 20 obtains the ID of the first message from the message notification. In step S305, the ID of the first message is added to the message view indication and the message view indication is sent to the mobile terminal 10. After receiving the message view indication, the mobile terminal 10 determines, according to the ID of the first message in the message view indication, that the user has chosen to view the first message.

Optionally, the processor 201 of the wearable device 20 may obtain the ID of the first message from the message notification and save the ID of the first message in the memory 204. After determining that the user has chosen to view the first message, the processor 201 of the wearable device 20 generates the message view indication, where the message view indication includes the ID of the first message that is recorded in the memory 204. Optionally, in the following manner 2 of sending the message view indication by the wearable device 20, the message view indication further includes the information, recorded in the memory 204, about the second moment at which the user chooses to view the first message, and the processor 201 may send the message view indication to the mobile terminal 10 by using the near field communication circuit 210.

S306: The mobile terminal 10 detects whether the mobile terminal 10 is used, and if the mobile terminal 10 is used, records a first moment at which that the mobile terminal 10 is used is detected.

The sensor 107 of the mobile terminal 10, for example, an inertial sensor, senses a motion status of the mobile terminal 10. For example, when sensing that the mobile terminal 10 is picked up, the sensor 107 sends a sensing signal to the processor 101, and after receiving the sensing signal, the processor 101 determines that the mobile terminal 10 is used and records, in the memory 105, information about the first moment at which the mobile terminal 10 is used. The processor 101 may determine the first moment according to system time on the mobile terminal 10, or obtain reference time from a network (such as a cellular network or a wireless local area network) by using the RF circuit 102 or the WiFi module 103, and determine the first moment according to the obtained reference time.

S307: The mobile terminal 10 determines whether a time interval between the first moment and a second moment is less than a time interval threshold, and if the time interval is less than the time interval threshold, step S310 is performed.

Optionally, the processor 101 of the mobile terminal 10 determines whether the time interval between the second moment and the first moment that is recorded in the memory 105 is less than the time interval threshold.

When the processor 101 determines that the time interval between the first moment and the second moment is less than the time interval threshold, step S308 is performed.

S308: The mobile terminal 10 requests, from an application server corresponding to a web page, web page content at an address identified by web page address information.

The application server used when the mobile terminal 10 requests the web page content may be same as or different from the server that sends the first message in step S301.

Optionally, the processor 101 requests, by using the RF circuit 102 or the WiFi module 103, the web page content at the address identified by the web page address information. The request may include the web page address information.

S309: The mobile terminal 10 receives the web page content.

The RF circuit 102 or the WiFi module 103 receives the web page content and sends the web page content to the processor 101. The processor 101 may process the received web page content and send processed information to the display screen 104. The display screen 104 displays the web page content according to the processed information.

S310: The mobile terminal 10 displays the web page content on the display screen.

It can be understood that before step S302, the mobile terminal 10 and the wearable device 20 have been paired. In steps S302 and S305, the mobile terminal 10 and the wearable device 20 may establish a connection to transmit information that needs to be exchanged.

Optionally, after performing step S305, the wearable device 20 returns to a page displaying the message notification; or the wearable device 20 may obtain, from the mobile terminal 10, the web page content in the first message, and display the web page content on the display screen of the wearable device 20; or optionally, in S307, if the mobile terminal 10 determines that the time interval between the first moment and the second moment is greater than or equal to the time interval, it indicates that the user does not use the mobile terminal 10 in a timely manner, and in this case, steps S308 to S310 are not performed, and the mobile terminal 10 may display only the first message on the display screen 104.

An optional implementation is described above: If the mobile terminal 10 determines that the time interval between the first moment and the second moment is less than the time interval, steps S308 to S310 are performed; and if the mobile terminal 10 determines that the time interval between the first moment and the second moment is greater than or equal to the time interval, it indicates that the user does not use the mobile terminal 10 in a timely manner, and in this case, steps S308 to S310 are not performed, and the mobile terminal 10 may display only the first message on the display screen 104.

Another optional implementation is: If the mobile terminal 10 determines that the time interval between the first moment and the second moment is not greater than the time interval, steps S308 to S310 are performed; and if the mobile terminal 10 determines that the time interval between the first moment and the second moment is greater than the time interval, it indicates that the user does not use the mobile terminal 10 in a timely manner, and in this case, steps S308 to S310 are not performed, and the mobile terminal 10 may display only the first message on the display screen 104.

In the procedure shown in FIG. 3, that the wearable device 20 sends the message view indication and the mobile terminal 10 determines the second moment may include but not limited to the following three optional implementations:

Manner 1:

When determining that the user has chosen to view the first message, the wearable device 20 sends the message view indication to the mobile terminal 10. After receiving the message view indication, the mobile terminal 10 determines that the user has chosen to view the first message, and uses a moment at which the message view indication is received as the second moment.

In manner 1, optionally, the message notification includes the ID of the first message.

The ID of the first message included in the message view indication is obtained by the wearable device 20 from the message notification and is added to the message view indication. The mobile terminal 10 determines, according to the ID of the first message in the message view indication, that the user has chosen to view the first message.

Figure 4:
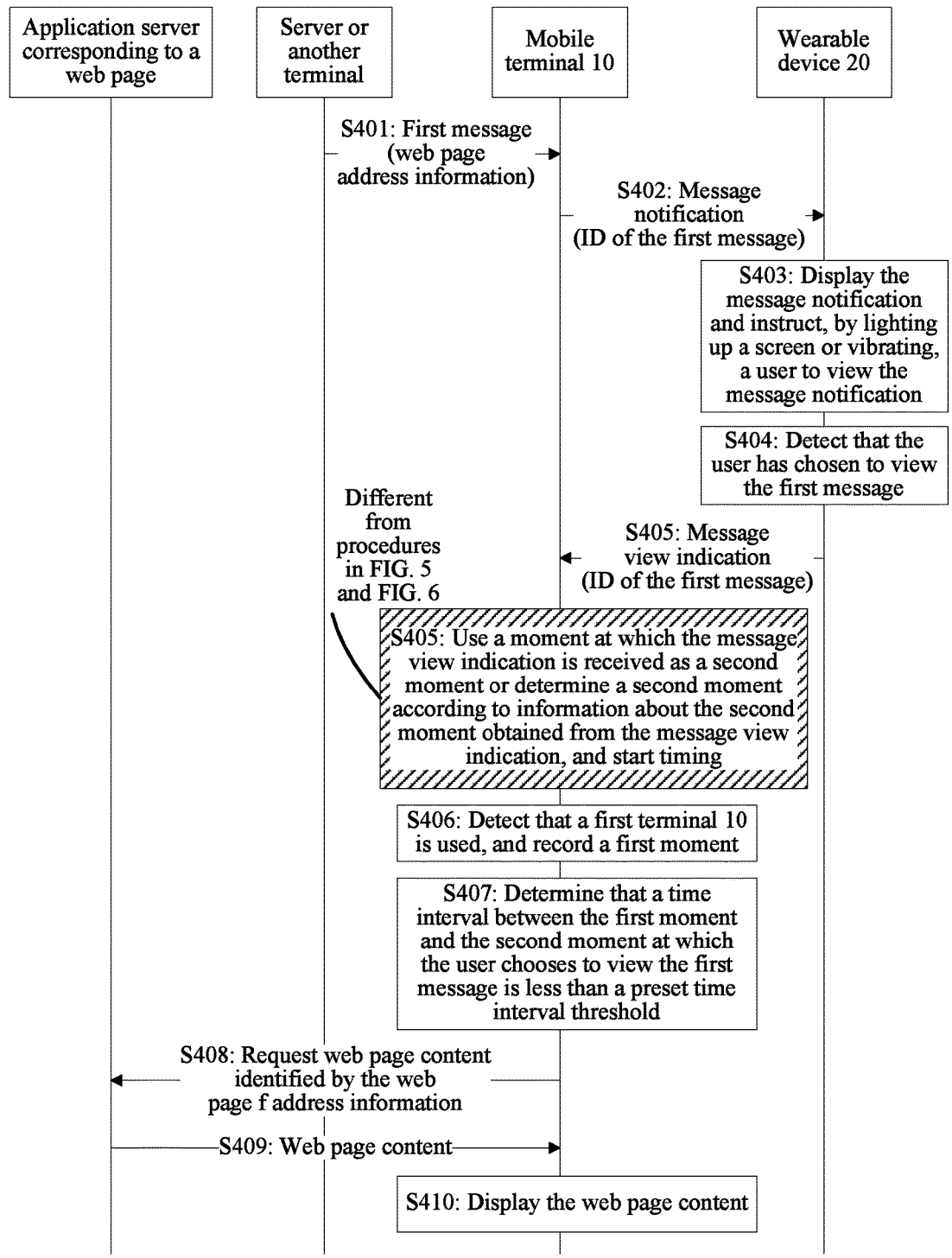
FIG. 4 is a flowchart 2 of a message transfer procedure according to an embodiment of this application.

For an example of manner 1, reference may be made to a procedure shown in FIG. 4.

Manner 2:

After detecting that the mobile terminal 10 is used, the mobile terminal 10 sends a first query message to the wearable device 20; and after receiving the first query message, if determining that the user has chosen to view the first message, in response to the message view query, the wearable device 20 sends the message view indication to the mobile terminal 10. The message view indication may include the ID of the first message, and the mobile terminal 10 determines, according to the ID of the first message in the message view indication, that the user has chosen to view the first message. The message view indication further includes information about a moment at which the second terminal 20 detects that the user chooses to view the first message, and the mobile terminal 10 uses a moment determined according to the information, as the second moment.

Figure 5:
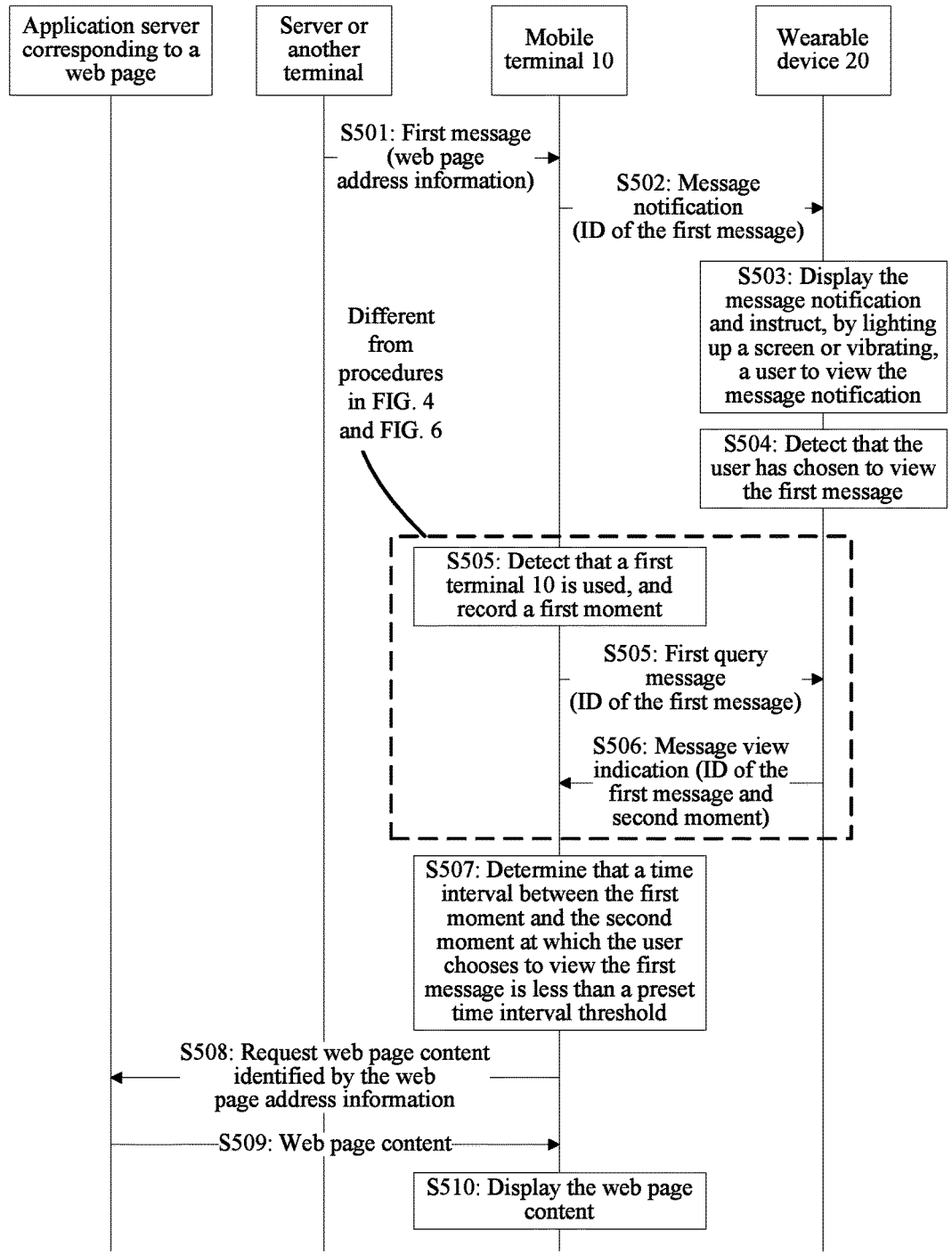
FIG. 5 is a flowchart 3 of a message transfer procedure according to an embodiment of this application.

For an example of manner 2, reference may be made to a procedure shown in FIG. 5.

Manner 3:

After detecting that the mobile terminal 10 is used, the mobile terminal 10 sends a second query message to the wearable device 20, where the second query message includes the identification of the first message and the information about the first moment.

After receiving the second query message, the wearable device 20 obtains the information about the first moment from the second query message, and determines the first moment according to the information; and after determining that the user has chosen to view the first message and that the time interval between the first moment and the second moment is less than the time interval threshold, in response to the second query message, the wearable device 20 sends the message view indication to the mobile terminal 10 as a reply. The message view indication includes the identification of the first message.

After receiving the message view indication, the mobile terminal 10 determines, according to the identification of the first message in the message view indication, that the user has chosen to view the first message and that the time interval between the second moment and the first moment is less than the time interval threshold.

Figure 6:
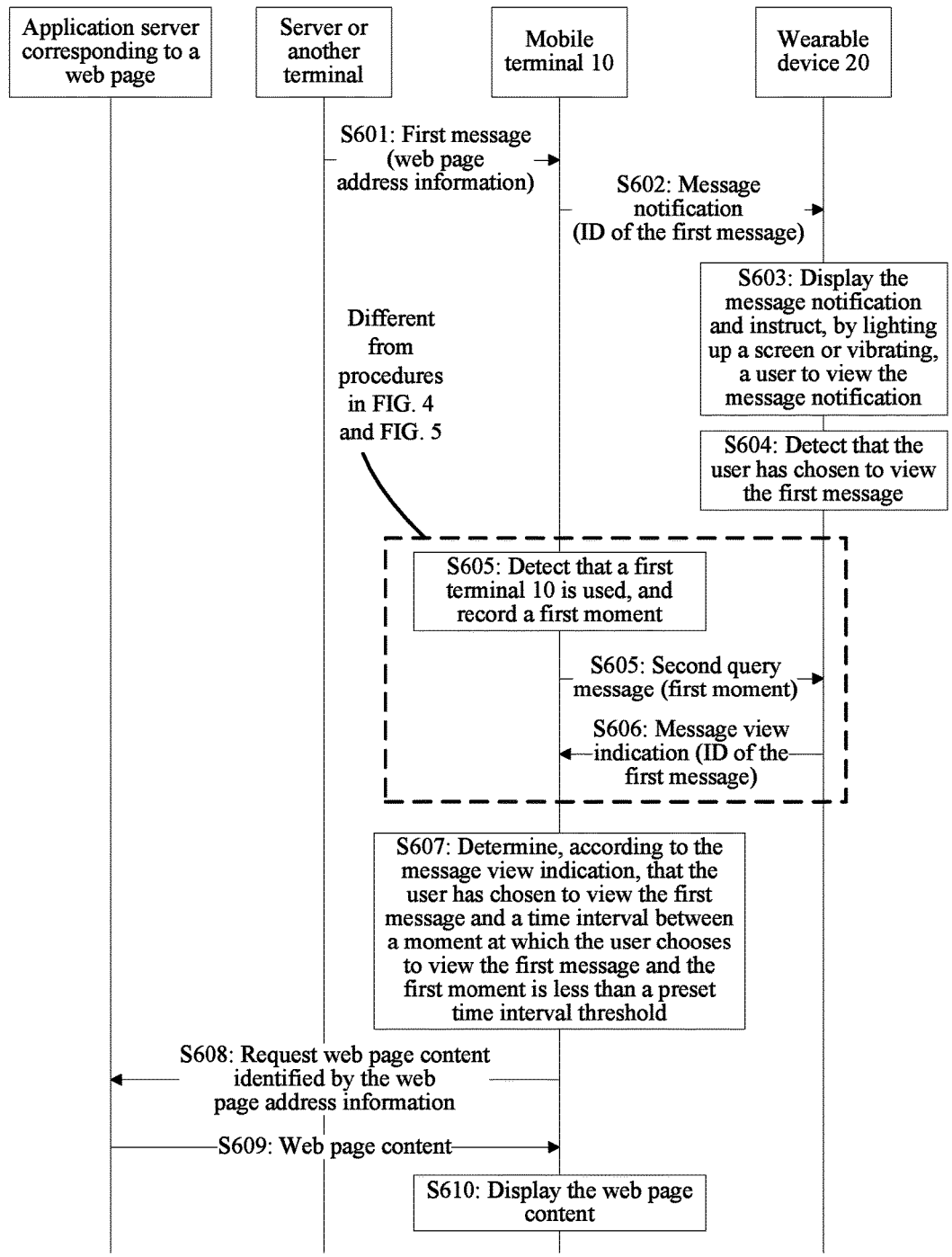
FIG. 6 is a flowchart 4 of a message transfer procedure according to an embodiment of this application.

For an example of manner 3, reference may be made to a procedure shown in FIG. 6.

It can be understood that between steps S304 and S305 or between steps S302 and S303, the wearable device 20 may further determine whether the first message includes the web page address information. If the first message includes the web page address information, steps S305 to S310 are performed. If the first message does not include the web page address information, the wearable device 20 may obtain only the first message from the mobile terminal 10 according to the prior art, and display the first message.

In an implementation, the mobile terminal 10 or the wearable device 20 may further start a timer which is set according to the time interval threshold, after either of the following occurs: ① that the mobile terminal 10 is used is detected, or ② the mobile terminal 10 receives the message view indication; and before the timer expires, determine whether the other in ① and ② occurs. If the other occurs, steps S308 to S310 are performed.

For example, when receiving the message view indication, the mobile terminal 10 may start a timer which is set according to the time interval threshold, and before the timer expires, determine whether that the mobile terminal 10 is used is detected. If that the mobile terminal 10 is used is detected, steps S308 to S310 are performed.

For another example, the wearable device 20 may start a timer after detecting that the user has chosen to view the first message, and after the timer expires, determine whether the second query message is received (in this case, the mobile terminal 10 immediately sends the second query message when detecting that the mobile terminal 10 is used). If the second query message is received, steps S308 to S310 are performed. The timer is set according to the time interval threshold.

In another implementation, when the mobile terminal 10 receives the message view indication, and if the message view indication includes information about the second moment, the mobile terminal 10 may start a timer, and before the timer expires, determine whether that the mobile terminal 10 is used is detected. If that the mobile terminal 10 is used is detected, steps S308 to S310 are performed. The timer is set according to a difference resulting from subtracting, from the time interval threshold, a time interval between a moment at which the message view indication is received and the second moment carried in the message view indication.

The procedures in FIG. 4 to FIG. 6 are separately described in the following.

FIG. 4 is a flowchart 2 of a message transfer procedure according to an embodiment of this application. As shown in FIG. 4, the procedure includes the following steps.

Steps S401 to S404 are the same as steps S301 to S304, respectively.

S405: The wearable device 20 sends a message view indication to the mobile terminal 10, and after receiving the message view indication, the mobile terminal 10 may determine, according to an identification of the first message in the message view indication, that the user has chosen to view the first message, and use a moment at which the message view indication is received as a second moment.

For a manner of sending the message view indication to the mobile terminal 10 by the wearable device 20, reference may be made to step S305.

Optionally, after determining that the message view indication includes the ID of the first message, the mobile terminal 10 records a moment at which the message view indication is received, and starts timing. Optionally, previous timing result of another message may be cleared.

Optionally, the mobile terminal 10 may receive, by using the near field communication circuit 108, the message view indication sent by the wearable device 20. The near field communication circuit 108 sends the received message view indication to the processor 101. After recognizing that the message view indication includes the ID of the first message, the processor 101 records, in the memory 105, the moment at which the message view indication is received, and starts timing. Alternatively, the message view indication may include information about a second moment. The processor 101 obtains the information from the message view indication, and determines the second moment according to the information. Optionally, the processor 101 clears the previous timing result of the another message.

Steps S406 to S410 are the same as steps S306 to S310, respectively.

FIG. 5 is a flowchart 3 of a message transfer procedure according to an embodiment of this application. As shown in FIG. 5, the procedure includes the following steps.

Steps S501 to S504 are the same as steps S301 to S304, respectively.

S505: The mobile terminal 10 detects whether the mobile terminal 10 is used, and if the mobile terminal 10 is used, records a first moment at which that the mobile terminal 10 is used is detected, and sends a first query message to the wearable device 20, where optionally, the first query message may include an ID of the first message; after receiving the first query message, the wearable device 20 detects, according to the ID of the first message, whether the user has chosen to view the first message.

For a method of detecting, by the mobile terminal 10, whether the mobile terminal 10 is used, reference may be made to step S306.

Optionally, after detecting, by using the sensor 107, that the mobile terminal 10 is used, the processor 101 of the mobile terminal 10 generates the first query message, where the first query message includes the ID of the first message. The processor 101 sends the first query message to the wearable device 20 by using the near field communication circuit 108.

The wearable device 20 receives the first query message by using the near field communication circuit 210. The near field communication circuit 210 sends the first query message to the processor 201.

S506: After receiving the first query message, the wearable device 20 generates a message view indication, where the message view indication includes the ID of the first message and information about a second moment, and the wearable device 20 sends the generated message view indication to the mobile terminal 10.

Optionally, after receiving the first query message by using the near field communication circuit 210, the processor 201 obtains the ID of the first message from the message view query, queries the memory 204 according to the obtained ID of the first message to obtain, from the memory 204, the second moment at which the user chooses to view the first message. The processor 201 adds the information about the second moment to the message view query.

The wearable device 20 may be likely to receive multiple notifications during a period of time, instructing the wearable device 20 to receive a message. Therefore, after receiving the first query message, the wearable device 20 needs to determine, according to a message ID in the first query message, a message that the first query message is specific to. The processor 201 queries the memory 204 according to the ID of the first message in the first query message, so as to find the second moment at which the user chooses to view the first message and that is recorded in the memory 204.

The processor 101 generates the message view indication, where the message view indication includes the ID of the first message and the information about the second moment.

S507: After receiving the message view indication, the mobile terminal 10 obtains the ID of the first message and the information about the second moment from the message view indication, and the mobile terminal 10 determines, according to the ID of the first message, that the user has chosen to view the first message, and determines the second moment according to the information about the second moment. The mobile terminal 10 determines whether a time interval between the first moment and the second moment is less than a time interval threshold.

Optionally, the mobile terminal 10 receives, by using the near field communication circuit 108, the message view indication sent by the wearable device 20, and sends the received message view indication to the processor 101. The processor 101 obtains the ID of the first message and the information about the second moment from the message view indication, determines, according to the ID of the first message, that the user has chosen to view the first message, and determines the second moment according to the information about the second moment.

For an optional method of determining, by the mobile terminal 10, whether the time interval between the first moment and the second moment is less than the time interval threshold, reference may be made to step S307.

If it is determined that the time interval between the first moment and the second moment is less than the time interval threshold, steps S508 to S510 are performed.

For steps S508 to S510, reference may be made to steps S308 to S310.

Optionally, the mobile terminal 10 may alternatively send a second query message after sending the first query message in step S505 and before obtaining the web page content in step S508. The message includes information about the first moment. After the wearable device 20 receives the second query message, if the user has chosen to view the first message, the wearable device 20 determines whether the time interval between the second moment at which the user has chosen to view the first message and the first moment in the second query message is less than the time interval threshold. If the time interval is less than the time interval threshold, step S508 is performed.

The wearable device 20 adds, to the message view indication, both the information about the second moment and a result that the time interval between the second moment and the first moment is less than the time interval threshold. Alternatively, the wearable device 20 may send, by using an indication other than the message view indication, a result that the time interval between the second moment and the first moment is less than the time interval threshold.

FIG. 6 is a flowchart 4 of a message transfer procedure according to an embodiment of this application. As shown in FIG. 6, the procedure includes the following steps.

Steps S601 to S604 are the same as steps S301 to S304, respectively.

S605: The mobile terminal 10 detects whether the mobile terminal 10 is used, and if the mobile terminal 10 is used, records a first moment at which that the mobile terminal 10 is used is detected, and sends a second query message to the wearable device 20, where the second query message may include information about the first moment.

For a method of detecting, by the mobile terminal 10, whether the mobile terminal 10 is used, reference may be made to step S306.

Optionally, after detecting, by using the sensor 107, that the mobile terminal 10 is used, the processor 101 of the mobile terminal 10 generates the second query message, where the second query message includes the information about the first moment. The processor 101 sends the second query message to the wearable device 20 by using the near field communication circuit 108.

The wearable device 20 receives the second query message by using the near field communication circuit 210. The near field communication circuit 210 sends the second query message to the processor 201.

S606: After receiving the second query message, the wearable device 20 determines whether in a message that the user has chosen to view, there is a message that a time interval between a moment at which the user chooses to view the message and the first moment is less than a time interval threshold. If there is the message, an ID of the message is determined. The wearable device 20 generates a message view indication, where the message view indication includes the determined ID of the message. The wearable device 20 sends the generated message view indication to the mobile terminal 10.

Optionally, after receiving the second query message by using the near field communication circuit 210, the processor 201 obtains the information about the first moment from the second query message. The processor 201 determines the first moment according to the information, and queries the memory 204 to obtain, from the memory 204, the ID of the message that the time interval between the moment at which the user chooses to view the message and the first moment is less than the time interval threshold.

If finding the message satisfying the foregoing condition (that is, the user has chosen to view the message and the time interval between the moment at which the message is chosen to be viewed and the first moment is less than the time interval threshold), the processor 101 generates the message view indication, where the message view indication includes the ID of the found message.

The first message is used as an example. If a time interval between a second moment at which the user has chosen to view the first message and the first moment is less than the time interval threshold, when the wearable device 20 generates the message view indication, the wearable device 20 adds an ID of the first message to the message view indication and sends the message view indication to the mobile terminal 10. After receiving the message view indication, the mobile terminal 10 determines, according to the ID of the first message in the message view indication, that the user has chosen to view the first message and that the time interval between the first moment and the second moment is less than the time interval threshold.

If there is no message satisfying the foregoing condition, the wearable device 20 may perform processing in any one of the following manners:

skipping replying with the message view indication;

adding null, NULL or empty, or 1 to the replied message view indication, so that when the message view indication received by the mobile terminal 10 includes such information, the mobile terminal 10 determines that there is no message satisfying the foregoing condition; or replying with an empty message.

S607: After receiving the message view indication, the mobile terminal 10 obtains an ID of the first message (or an ID of another message that satisfies the foregoing condition) from the message view indication, and the mobile terminal 10 determines, according to the ID of the first message in the message view indication, that the user has chosen to view the first message and that a time interval between the first moment and a second moment is less than the time interval threshold.

Optionally, the mobile terminal 10 receives, by using the near field communication circuit 108, the message view indication sent by the wearable device 20, and sends the received message view indication to the processor 101. The processor 101 obtains the ID of the first message from the message view indication, and determines, according to the ID of the first message, that the user has chosen to view the first message and that the time interval between the first moment and the second moment is less than the time interval threshold.

For steps S608 to S610, reference may be made to steps S308 to S310.

Figure 7:
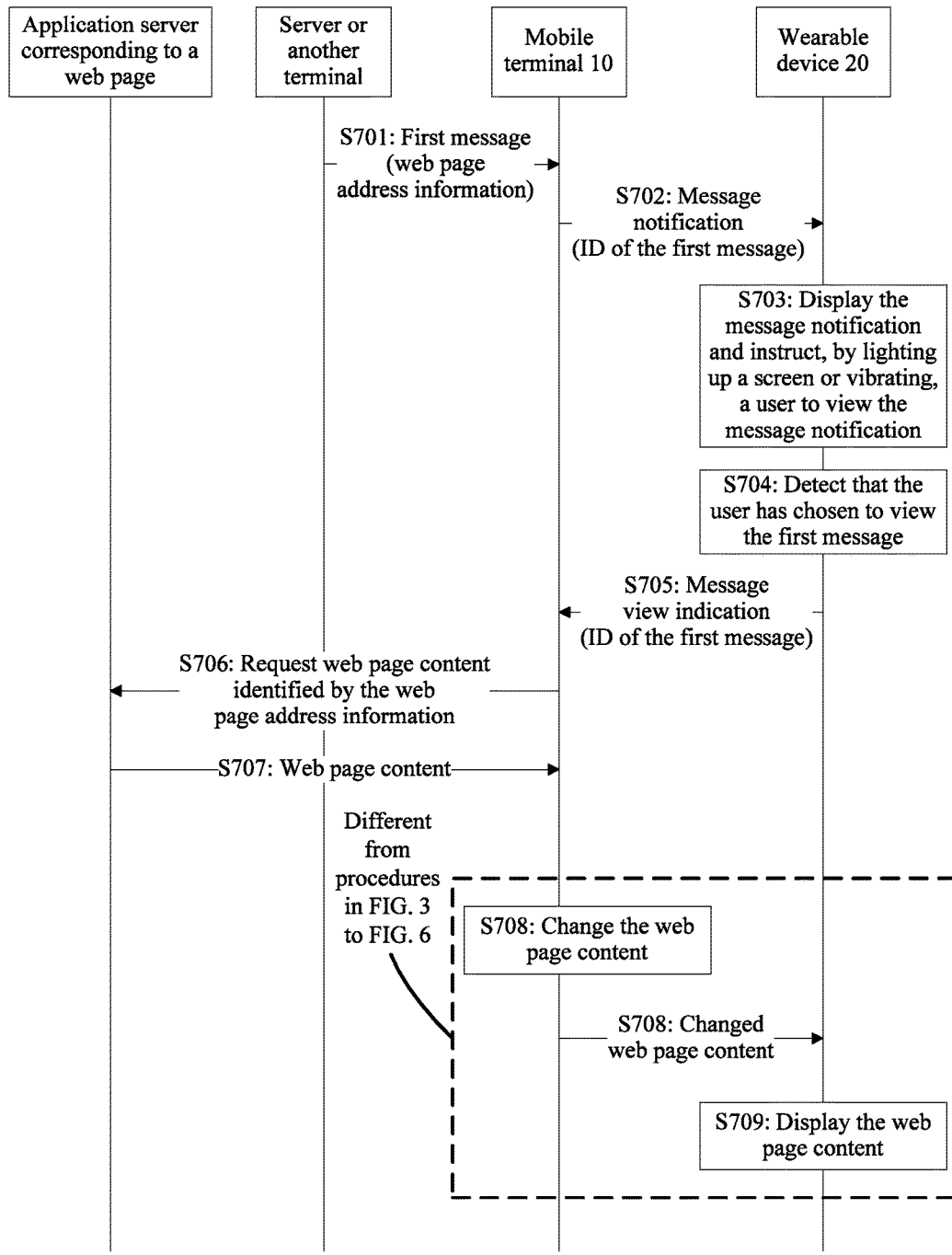
FIG. 7 is a flowchart 5 of a message transfer procedure according to an embodiment of this application.

FIG. 7 is a flowchart 5 of a message transfer procedure according to an embodiment of this application. As shown in FIG. 7, the procedure includes the following steps.

Steps S701 to S705 are the same as steps S301 to S305, respectively.

S706: The mobile terminal 10 requests, from an application server corresponding to a web page, web page content at an address identified by web page address information.

The application server used when the mobile terminal 10 requests the web page content may be same as or different from the server that sends the first message in step S701.

Optionally, the processor 101 sends a request by using the RF circuit 102 or the WiFi module 103, requesting the web page content at the address identified by the web page address information. The request may include the web page address information.

S707: The mobile terminal 10 receives the web page content.

The mobile terminal 10 receives the web page content by using the RF circuit 102 or the WiFi module 103.

S708: The mobile terminal 10 changes the web page content, so that a web page corresponding to the changed web page content is suitable to be displayed on the display screen 203 of the wearable device 20, and the mobile terminal 10 sends the changed web page content to the wearable device 20.

Optionally, the mobile terminal 10 may perform modification, addition or deletion, format replacement, or another change on the web page content according to a display characteristic of the wearable device 20, so that the web page corresponding to the changed web page content is suitable to be displayed and/or to receive a user operation on the display screen 203 of the wearable device 20.

Optionally, the RF circuit 102 or the WiFi module 103 of the mobile terminal 10 sends the received web page content to the processor 101. The processor 101 performs an operation such as modification, addition or deletion, format replacement, or another change, and sends the changed web page content to the wearable device 20 by using the near field communication circuit 108.

S709: After receiving the web page content, the wearable device 20 displays the web page content on the display screen 204.

Optionally, the wearable device 20 receives the web page content by using the near field communication circuit 210 and sends the web page content to the processor 201. The processor 201 processes the web page content and sends processed web page content to the display screen 203. The display screen 203 displays the processed web page content.

Figure 8:
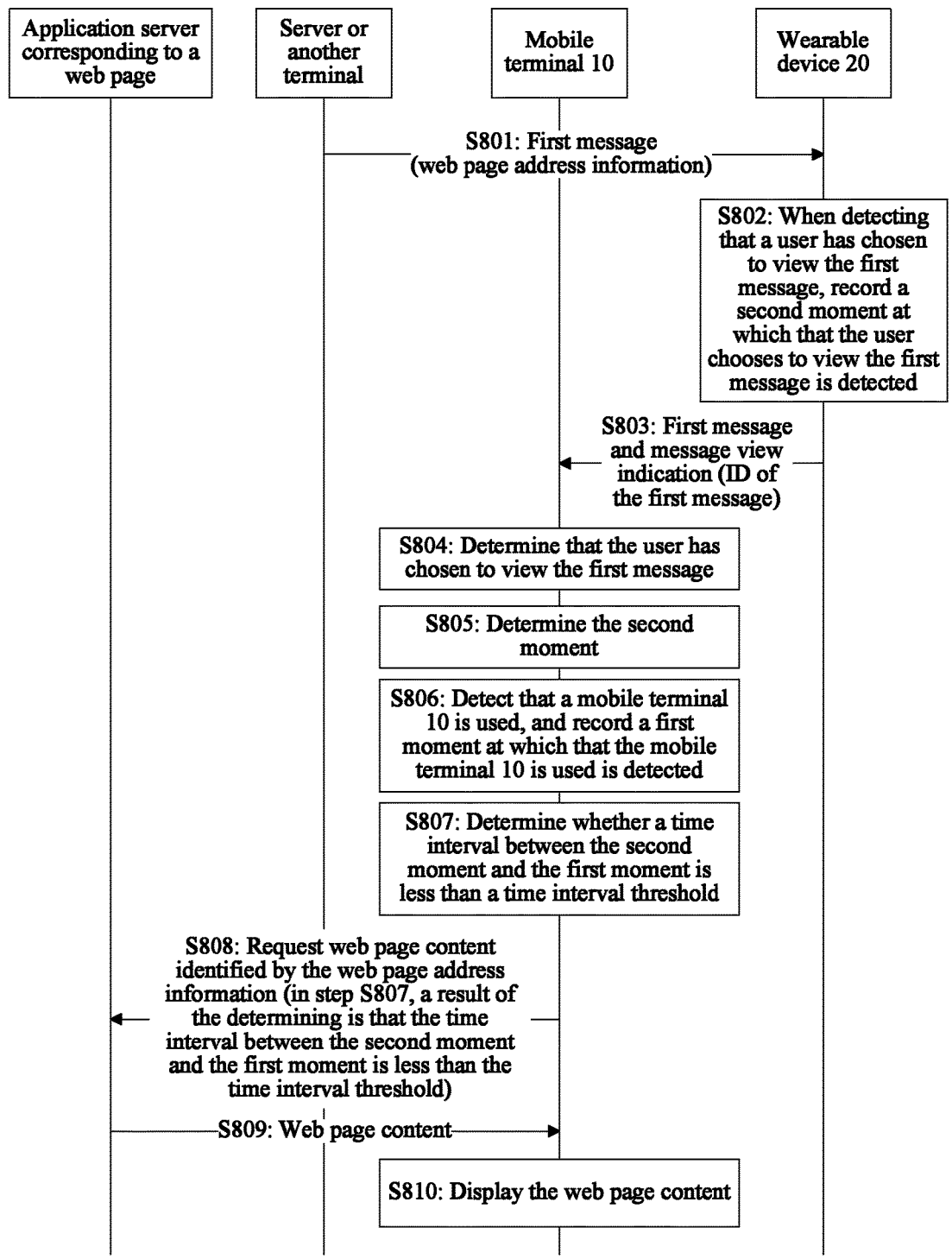
FIG. 8 is a flowchart 6 of a message transfer procedure according to an embodiment of this application.

FIG. 8 is a flowchart 6 of a message transfer procedure according to an embodiment of this application. As shown in FIG. 8, the procedure includes the following steps.

S801: The wearable device 20 receives, from a server or another terminal, a first message including web page address information.

The wearable device 20 may receive the first message by using the RF circuit 202 or the WiFi module 207. The RF circuit 202 or the WiFi module 207 sends the received first message to the processor 201 of the wearable device 20. After receiving the first message, the processor 201 controls the display screen 203 to display a message notification of the first message, for example, display a content summary of the first message, an application icon corresponding to the first message, and/or a name of an application for sending the first message.

S802: When detecting that a user chooses to view the first message, the wearable device 20 records a second moment at which that the user chooses to view the first message is detected.

For a method of instructing, by the wearable device 20, the user to view the message notification of the first message, reference may be made to related descriptions in step S303. For a method of detecting, by the wearable device 20, that the user chooses to view the first message, reference may be made to related descriptions in step S304.

S803: The wearable device 20 sends the first message and a message view indication to the mobile terminal 10, where the message view indication includes an identification of the first message, and the first message includes the web page address information.

The wearable device 20 may send the first message and the message view indication to the mobile terminal 10 by using the near field communication circuit 210. The mobile terminal 10 may receive the first message and the message view indication by using the near field communication circuit 108.

During implementation, once the wearable device 20 detects that the user has chosen to view the first message, the wearable device 20 sends the message view indication to the mobile terminal 10. The mobile terminal 10 may use a moment at which the first message is received as the second moment at which the user has chosen to view the first message. Alternatively, the wearable device 20 may add information about the second moment to a query message, and after receiving the message view indication, the mobile terminal 10 determines the second moment according to the information about the second moment in the message.

The message view indication may alternatively be combined with the first message into one message and sent.

S804: The mobile terminal 10 determines, according to the message view indication, that the user has chosen to view the first message.

S805: The mobile terminal 10 determines the second moment at which the wearable device 20 detects that the user chooses to view the first message.

S806: The mobile terminal 10 detects that the mobile terminal 10 is used, and records a first moment at which that the mobile terminal 10 is used is detected.

For a method of detecting, by the mobile terminal 10, that the mobile terminal 10 is used, reference may be made to step S306.

S807: The mobile terminal 10 determines whether a time interval between the second moment and the first moment is less than a time interval threshold, and if yes, step S808 is performed.

S808: The mobile terminal 10 requests, from an application server corresponding to a web page, web page content identified by the web page address information.

S809: The mobile terminal 10 obtains the web page content from the application server corresponding to the web page.

S810: The mobile terminal 10 displays the web page content.

Different from the message transfer procedure shown in FIG. 3, in this procedure, the wearable device 20 receives the first message from the server or the another terminal, and when determining that the user has chosen to view the first message, sends the first message and the message view indication to the mobile terminal 10. In the procedure shown in FIG. 3, after receiving the first message from the server or the another terminal, the mobile terminal 10 provides the notification for the wearable device 20.

The application server used when the mobile terminal 10 requests the web page content in step S808 may be same as or different from the server that sends the first message in step S801.

It can be understood that between steps S801 and S802, the wearable device 20 may further determine whether the first message includes the web page address information. If the first message includes the web page address information, step S802 and subsequent steps are performed. If the first message does not include the web page address information, according to the prior art, the wearable device 20 may display the first message.

In an implementation, the mobile terminal 10 may start a timer when receiving the message view indication, and before the timer expires, determine whether that the mobile terminal 10 is used is detected. If that the mobile terminal 10 is used is detected, steps S808 and S809 are performed. The timer is set according to the time interval threshold.

In any procedure shown in FIG. 3 to FIG. 8, if the message view indication further includes an ID of another message, the mobile terminal 10 may also display, on the display screen 104, a web page corresponding to web page address information included in the another message. In case of multiple messages, the mobile terminal 10 may determine a web page display order and display web pages in the determined order. Alternatively, when the mobile terminal 10 displays one web page, prompt information may be shown on the display screen 104, prompting the user whether another web page is to be displayed.

There may be multiple manners of determining the web page display order by the mobile terminal 10, for example, based on a message arrival order, first displaying a web page corresponding to a message that first arrives;

based on a message arrival order, first displaying a web page corresponding to a message that arrives last;

based on importance of message content, first displaying a web page corresponding to a message with most important content;

based on pre-specified priorities of applications to which messages belong, first displaying a web page corresponding to a message belonging to a higher-priority application; or based on a device status, first displaying a web page corresponding to a message belonging to an application corresponding to a current status, for example, when a device is in a high-speed moving state and it is pre-specified that in a high-speed moving state, a web page corresponding to a message belonging to a transportation-related application is displayed first, if there is a message belonging to a transportation-related application, a web page corresponding to the message is displayed first.

Figure 9:
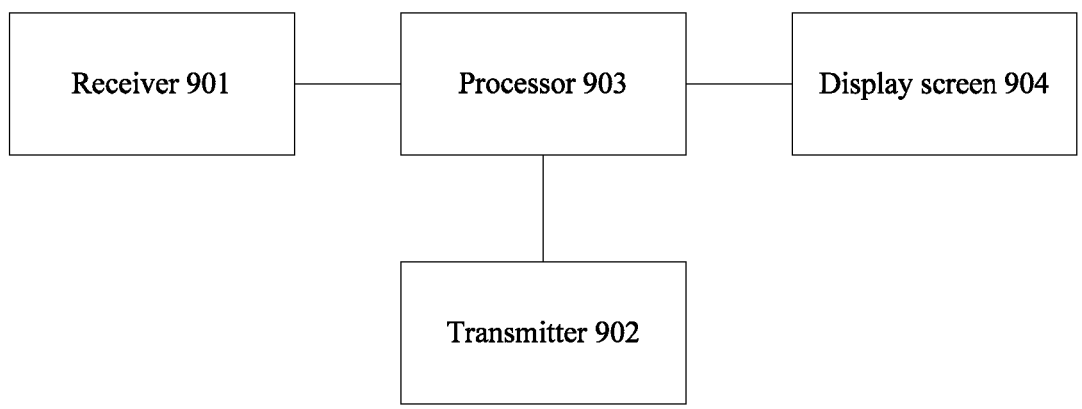
FIG. 9 is a schematic structural diagram 1 of a mobile terminal according to an embodiment of this application.

FIG. 9 is a schematic structural diagram 1 of a mobile terminal according to an embodiment of this application. As shown in the figure, the mobile terminal includes:

a receiver 901, configured to receive a first message from a server or another terminal, where the first message includes web page address information;

a transmitter 902, configured to send a message notification to a wearable device paired with the mobile terminal, where the message notification includes the web page address information;

a processor 903, configured to: detect that the mobile terminal is used, and record a first moment at which that the mobile terminal is used is detected, where the receiver 901 is configured to receive a message view indication sent by the wearable device paired with the mobile terminal, where the message view indication includes an identification of the first message;

the processor 903 is further configured to determine, according to the message view indication, that a user has chosen, according to the message notification, to view the first message;

the processor 903 is further configured to determine whether a time interval between a second moment and the first moment is less than a time interval threshold, where the second moment is a moment at which the user chooses, according to the message notification, to view the first message; and the receiver 901 is further configured to: when the processor 903 determines that the time interval between the second moment and the first moment is less than the time interval threshold, obtain web page content corresponding to the web page address information; and a display screen 904, configured to display the web page content obtained by the receiver 901.

Optionally, the message notification includes the identification of the first message, and the processor 903 is specifically configured to: if the message view indication includes the identification of the first message, determine that the user has chosen, according to the message notification, to view the first message.

Optionally, the transmitter 902 is further configured to: after the processor 903 detects that the mobile terminal is used, and before the receiver 901 receives the message view indication sent by the wearable device paired with the mobile terminal, send a first query message to the wearable device, where the first query message includes the identification of the first message; and the receiver 901 is specifically configured to receive the message view indication sent by the wearable device according to the first query message.

Optionally, the processor 903 is further configured to:

record a moment at which the mobile terminal receives the message view indication, and use the moment at which the mobile terminal receives the message view indication, as the second moment.

Optionally, the message view indication further includes a moment at which the wearable device detects that the user chooses to view the first message, and the processor 903 is further configured to use the moment at which the wearable device detects that the user chooses to view the first message, as the second moment.

Optionally, the transmitter 902 is further configured to: after the processor 903 detects that the mobile terminal is used, send a second query message to the wearable device, where the second query message includes information about the first moment; and the receiver 901 is further configured to: before the processor 903 determines whether the time interval between the second moment and the first moment is less than the time interval threshold, receive a result determined by the wearable device that the time interval between the second moment and the first moment is less than the time interval threshold, where the second moment is a moment at which the wearable device detects that the user chooses to view the first message.

For a hardware implementation of the mobile terminal, reference may be made to FIG. 1 and related descriptions thereof. The receiver 901 may receive the first message from the server or the another terminal and obtain the web page content from an application server by using the RF circuit 102 and the WiFi module 103. The receiver 901 may perform receiving from the wearable device 20 by using the near field communication circuit 108.

The transmitter 902 may request the web page content and another message from the server or the another terminal by using the RF circuit 102 and the WiFi module 103. The transmitter 902 may send the message notification, a query indication, and the like to the wearable device 20 by using the near field communication circuit 108.

The processor 903 may be implemented by using the processor 101.

The display screen 904 may be implemented by using the display screen 104.

For other optional implementations of the mobile terminal, reference may be made to processing by the mobile terminal 10 in procedures shown in FIG. 3 to FIG. 6.

Figure 10:
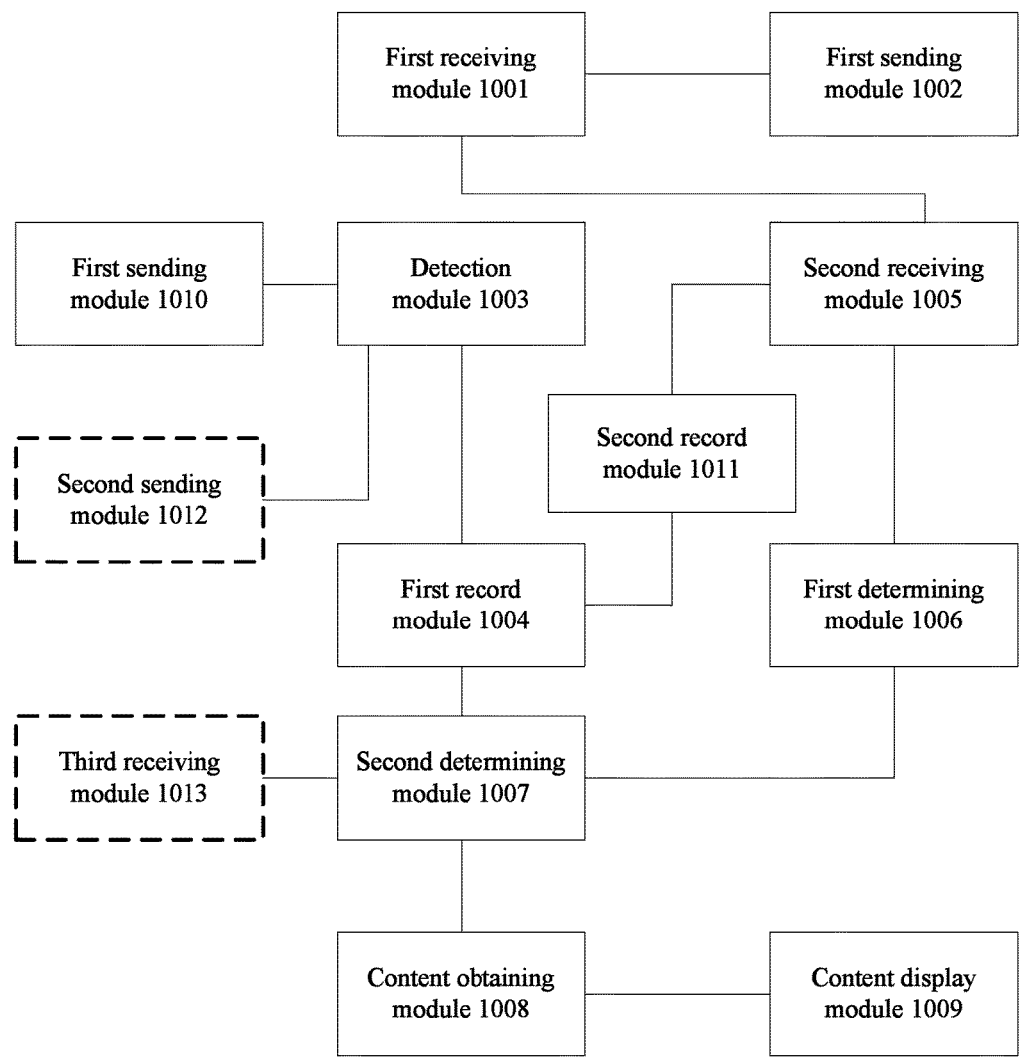
FIG. 10 is a schematic structural diagram 2 of a mobile terminal according to an embodiment of this application.

FIG. 10 is a schematic structural diagram 2 of a mobile terminal according to an embodiment of this application. As shown in the figure, the mobile terminal includes:

a first receiving module 1001, configured to receive a first message from a server or another terminal, where the first message includes web page address information;

a first sending module 1002, configured to send a message notification to a wearable device paired with the mobile terminal, where the message notification includes the web page address information;

a detection module 1003, configured to detect that the mobile terminal is used;

a first record module 1004, configured to record a first moment at which the detection module 1003 detects that the mobile terminal is used;

a second receiving module 1005, configured to receive a message view indication sent by the wearable device paired with the mobile terminal, where the message view indication includes an identification of the first message;

a first determining module 1006, configured to determine, according to the message view indication, that a user has chosen, according to the message notification, to view the first message;

a second determining module 1007, configured to determine whether a time interval between a second moment and the first moment is less than a time interval threshold, where the second moment is a moment at which the user chooses, according to the message notification, to view the first message;

a content obtaining module 1008, configured to: when the second determining module 1007 determines that the time interval between the second moment and the first moment is less than the time interval threshold, obtain web page content corresponding to the web page address information; and a content display module 1009, configured to display the web page content.

Optionally, the message notification includes the identification of the first message, and the first determining module 1006 is specifically configured to: if the message view indication includes the identification of the first message, determine that the user has chosen, according to the message notification, to view the first message.

Optionally, the mobile terminal further includes a first sending module 1010, configured to send a first query message to the wearable device after the detection module 1003 detects that the mobile terminal is used, and before the second receiving module 1005 receives the message view indication sent by the wearable device paired with the mobile terminal, where the first query message includes the identification of the first message; and the second receiving module 1005 is specifically configured to receive the message view indication sent by the wearable device according to the first query message.

Optionally, the mobile terminal further includes a second record module 1011, configured to: record a moment at which the second receiving module 1005 receives the message view indication, and use the moment at which the second receiving module 1005 receives the message view indication, as the second moment.

Optionally, the message view indication further includes a moment at which the wearable device detects that the user chooses to view the first message, and the mobile terminal further includes a second record module 1011, configured to use the moment at which the wearable device detects that the user chooses to view the first message, as the second moment.

Optionally, the mobile terminal further includes:

a second sending module 1012, configured to send a second query message to the wearable device after the detection module 1003 detects that the mobile terminal is used, where the second query message includes information about the first moment; and a third receiving module 1013, configured to: before the second determining module 1007 determines whether the time interval between the second moment and the first moment is less than the time interval threshold, receive a result determined by the wearable device that the time interval between the second moment and the first moment is less than the time interval threshold, where the second moment is a moment at which the wearable device detects that the user chooses to view the first message.

The third receiving module 1013 exists only when there is the second sending module 1012. The two modules are optional.

The first receiving module 1001 may be implemented by using the RF circuit 102 and the WiFi module 103. The first sending module 1002 may be implemented by using the near field communication circuit 108. The detection module 1003 may be implemented by using the processor 101. During implementation of the first record module 1004, the processor 101 may record the first moment in the memory 105. The second receiving module 1005 may be implemented by using the near field communication circuit 108. The first determining module 1006 may be implemented by using the processor 101. The second determining module 1007 may be implemented by using the processor 101. The content obtaining module 1008 may be implemented by using the RF circuit 102 and the WiFi module 103. The content display module 1009 may be displayed by using the display screen 104. The first sending module 1010 may be implemented by using the near field communication circuit 108. The second sending module 1012 may be implemented by using the near field communication circuit 108. The third receiving module 1013 may be implemented by using the near field communication circuit 108.

For other optional implementations of the mobile terminal, reference may be made to the mobile terminal 10 in FIG. 3 to FIG. 6.

Figure 11:
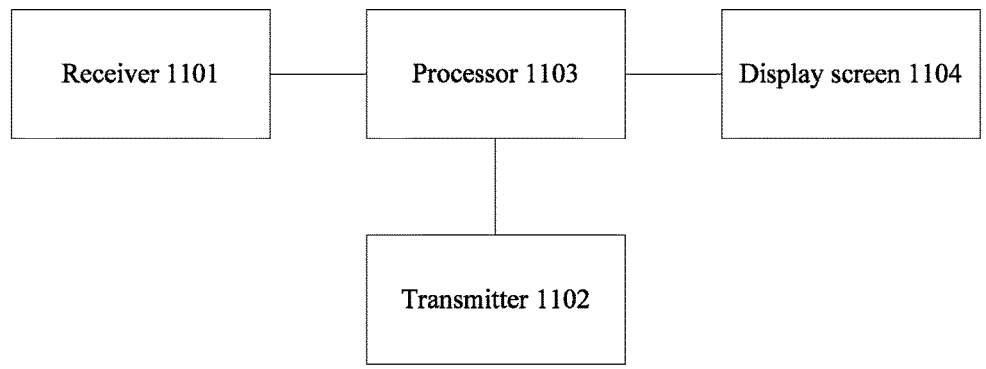
FIG. 11 is a schematic structural diagram 1 of a wearable device according to an embodiment of this application.

FIG. 11 is a schematic structural diagram 1 of a wearable device according to an embodiment of this application. As shown in the figure, the wearable device includes:

a receiver 1101, configured to receive a message notification from a mobile terminal paired with the wearable device, where the message notification includes web page address information and an identification of a first message, and the web page address information is included in the first message received by the mobile terminal;

a display screen 1104, configured to display the message notification received by the receiver 1101;

a processor 1103, configured to: detect that a user chooses, according to the message notification, to view the first message, and record a second moment at which that the user chooses to view the first message is detected; and a transmitter 1102, configured to send a message view indication to the mobile terminal, where there are multiple optional implementations of sending the message view indication by the transmitter 1102, for example, manner 1 and manner 2;

in manner 1, the message view indication includes the identification of the first message and information about the second moment; and in manner 2, the receiver 1101 is further configured to receive a second query message sent by the mobile terminal, where the second query message includes information about a first moment at which the mobile terminal detects that the mobile terminal is used; the processor 1103 is further configured to determine whether a time interval between the first moment and the second moment is less than a time interval threshold; and the transmitter 1102 is further configured to: when the processor 1103 determines that the time interval between the first moment and the second moment is less than the time interval threshold, send the message view indication to the mobile terminal, where the message view indication includes the identification of the first message.

In manner 1, optionally, the receiver 1101 is further configured to: before the transmitter 1102 sends the message view indication to the mobile terminal, receive a first query message sent by the mobile terminal, where the first query message includes the identification of the first message.

In manner 2, optionally, the transmitter 1102 is further configured to: when the time interval between the first moment and the second moment is less than the time interval threshold, send, to the mobile terminal, a result of the determining that the time interval between the second moment and the first moment is less than the time interval threshold.

For an optional hardware implementation of the wearable device, reference may be made to FIG. 2 and related descriptions thereof.

The receiver 1101 may be the near field communication circuit 210. The display screen 1104 may be the display screen 203. The transmitter 1102 may be the near field communication circuit 210. The processor 101 may be the processor 201.

For other optional implementations of the wearable device, reference may be made to implementations of the wearable device 20 in procedures shown in FIG. 3 to FIG. 6.

Figure 12:
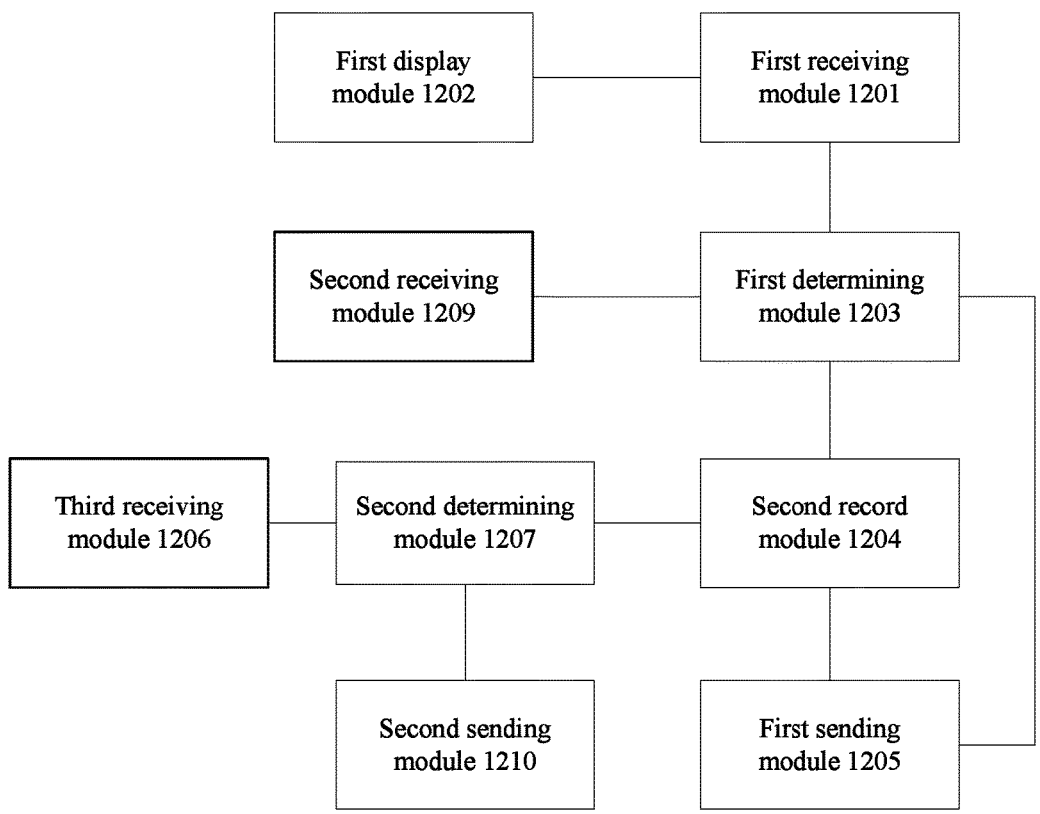
FIG. 12 is a schematic structural diagram 2 of a wearable device according to an embodiment of this application.

FIG. 12 is a schematic structural diagram 2 of a wearable device according to an embodiment of this application. As shown in the figure, the wearable device includes:

a first receiving module 1201, configured to receive a message notification from a mobile terminal paired with the wearable device, where the message notification includes web page address information and an identification of a first message, and the web page address information is included in the first message received by the mobile terminal;

a first display module 1202, configured to display the message notification on a display screen of the wearable device;

a first determining module 1203, configured to detect that a user chooses, according to the message notification, to view the first message; and a second record module 1204, configured to record a second moment at which the first determining module 1203 detects that the user chooses to view the first message, where there are multiple optional implementations of sending a message view indication by the wearable device, for example, manner 1 and manner 2;

in manner 1, a first sending module 1205 is configured to send the message view indication to the mobile terminal, where the message view indication includes the identification of the first message and information about the second moment; and in manner 2, a third receiving module 1206 is configured to receive a second query message sent by the mobile terminal, where the second query message includes information about a first moment at which the mobile terminal detects that the mobile terminal is used; a second determining module 1207 is configured to determine whether a time interval between the first moment and the second moment is less than a time interval threshold; and a first sending module 1205 is configured to: when the second determining module 1207 determines whether the time interval between the first moment and the second moment is less than the time interval threshold, send the message view indication to the mobile terminal, where the message view indication includes the identification of the first message.

In manner 1, optionally, the wearable device further includes:

a second receiving module 1209, configured to: before the first sending module 1205 sends the message view indication to the mobile terminal, receive a first query message sent by the mobile terminal, where the first query message includes the identification of the first message.

In manner 2, optionally, the wearable device 20 further includes:

a second sending module 1210, configured to: when the time interval between the first moment and the second moment is less than the time interval threshold, send, to the mobile terminal, a result of the determining that the time interval between the second moment and the first moment is less than the time interval threshold.

For an optional hardware implementation of the wearable device, reference may be made to FIG. 2 and related descriptions thereof.

The first receiving module 1201 may be implemented by using the near field communication circuit 210. The first display module 1202 may be implemented by using the display screen 203. The first determining module 1203 may be implemented by using the processor 201. Recording the second moment by the second record module 1204 may be: recording the second moment in the memory 204 by using the processor 201. The first sending module 1205 may be implemented by using the near field communication circuit 210. The third receiving module 1206 may be implemented by using the near field communication circuit 210. The second determining module 1207 may be implemented by using the processor 201. The second receiving module 1209 may be implemented by using the near field communication circuit 210. The second sending module 1210 may be implemented by using the near field communication circuit 210.

For other optional implementations of the wearable device, reference may be made to implementations of the wearable device 20 in procedures shown in FIG. 3 to FIG. 6.

Figure 13:
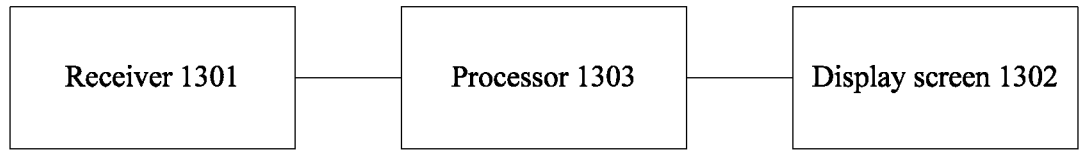
FIG. 13 is a schematic structural diagram 3 of a mobile terminal according to an embodiment of this application.

FIG. 13 is a schematic structural diagram 3 of a mobile terminal according to an embodiment of this application. As shown in the figure, the mobile terminal includes:

a receiver 1301, configured to receive a first message and a message view indication from a wearable device, where the first message includes web page address information, and the message view indication includes an identification of the first message;

a processor 1303, configured to determine a second moment, where the second moment is a moment at which the wearable device detects that a user chooses, according to a message notification, to view the first message, where the processor 1303 is further configured to: detect that the mobile terminal is used, and record a first moment at which that the mobile terminal is used is detected;

the processor 1303 is further configured to determine whether a time interval between the second moment and the first moment is less than a time interval threshold; and the receiver 1301 is further configured to: when the processor 1303 determines that the time interval between the second moment and the first moment is less than the time interval threshold, obtain web page content corresponding to the web page address information; and a display screen 1302, configured to display the web page content.

For a hardware implementation of the mobile terminal, reference may be made to FIG. 1 and related descriptions thereof. The receiver 1301 may receive the first message and/or the message view indication from the wearable device 20 by using the near field communication circuit 108. The receiver 1301 may receive the web page content from an application server by using the RF circuit 102 and the WiFi module 103.

The processor 1303 may be implemented by using the processor 101.

The display screen 1302 may be implemented by using the display screen 104.

For other optional implementations of the mobile terminal, reference may be made to processing by the mobile terminal 10 in a procedure shown in FIG. 8.

Figure 14:
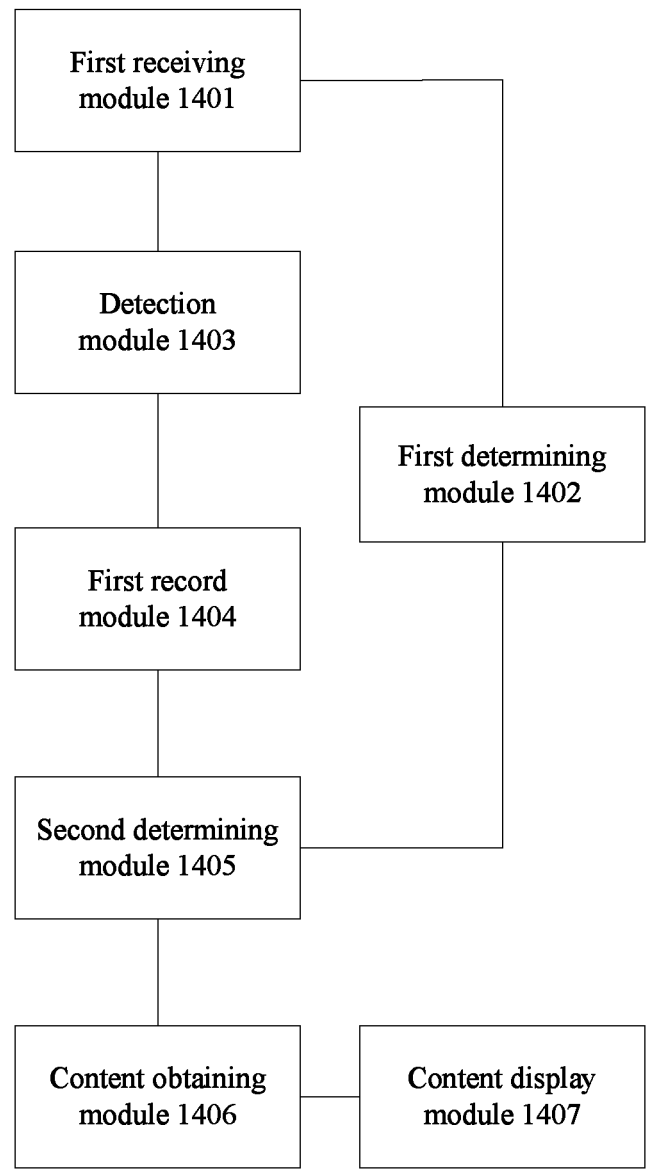
FIG. 14 is a schematic structural diagram 4 of a mobile terminal according to an embodiment of this application.

FIG. 14 is a schematic structural diagram 4 of a mobile terminal according to an embodiment of this application. As shown in the figure, the mobile terminal includes:

a first receiving module 1401, configured to receive a first message and a message view indication from a wearable device, where the first message includes web page address information, and the message view indication may include an identification of the first message;

a first determining module 1402, configured to determine a second moment, where the second moment is a moment at which the wearable device detects that a user chooses to view the first message;

a detection module 1403, configured to detect that the mobile terminal is used;

a first record module 1404, configured to record a first moment at which that the mobile terminal is used is detected;

a second determining module 1405, configured to determine whether a time interval between the second moment and the first moment is less than a time interval threshold;

a content obtaining module 1406, configured to: when the second determining module 1405 determines that the time interval between the second moment and the first moment is less than the time interval threshold, obtain web page content corresponding to the web page address information; and a content display module 1407, configured to display the web page content.

For a hardware implementation of the mobile terminal, reference may be made to FIG. 1 and related descriptions thereof. The first receiving module 1401 may be implemented by using the near field communication circuit 108. The first determining module 1402 may be implemented by using the processor 101. The detection module 1403 may be implemented by using the processor 101. Recording the first moment by the first record module 1404 may be: determining the first moment and recording the determined first moment in the memory 105 by the processor 101. The second determining module 1405 may be implemented by using the processor 101, and the processor 101 obtains the first moment from the memory 105 and performs comparison between the time interval threshold and the time interval between the obtained first moment and the second moment determined by the first determining module 1402. During implementation of the content obtaining module 1406, the RF circuit 102 or the WiFi module 103 may send a request to an application server corresponding to a web page, and the RF circuit 102 or the WiFi module 103 receives the web page content from the application server. The content display module 1407 may be implemented by using the display screen 104.

For other optional implementations of the mobile terminal, reference may be made to processing by the mobile terminal 10 in a procedure shown in FIG. 8.

Figure 15:
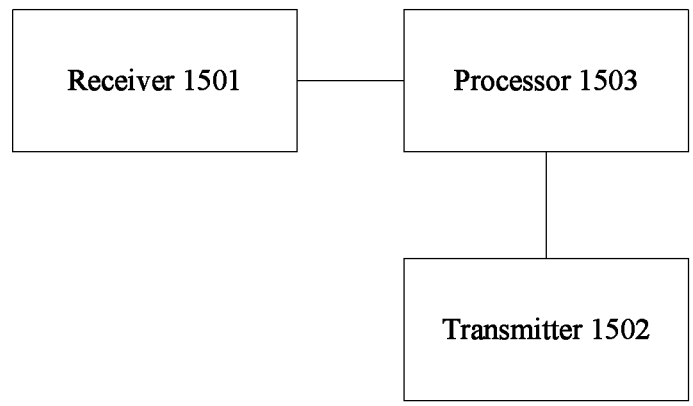
FIG. 15 is a schematic structural diagram 3 of a wearable device according to an embodiment of this application.

FIG. 15 is a schematic structural diagram 3 of a wearable device according to an embodiment of this application. As shown in the figure, the wearable device includes:

a receiver 1501, configured to receive a first message from a server or another terminal, where the first message includes web page address information;

a processor 1503, configured to: detect that a user chooses to view the first message, and record a second moment at which that the user chooses to view the first message is detected; and a transmitter 1502, configured to send the first message and a message view indication to a mobile terminal, where the message view indication includes an identification of the first message, and the first message includes the web page address information.

For an optional hardware implementation of the wearable device, reference may be made to FIG. 2 and related descriptions thereof. The receiver 1501 may be implemented by using the RF circuit 202 or the WiFi module 207. The processor 1503 may be implemented by using the processor 201. The transmitter 1502 may be implemented by using the near field communication circuit 210.

For other optional implementations of the wearable device, reference may be made to an implementation of the wearable device 20 in the procedure shown in FIG. 8.

Figure 16:
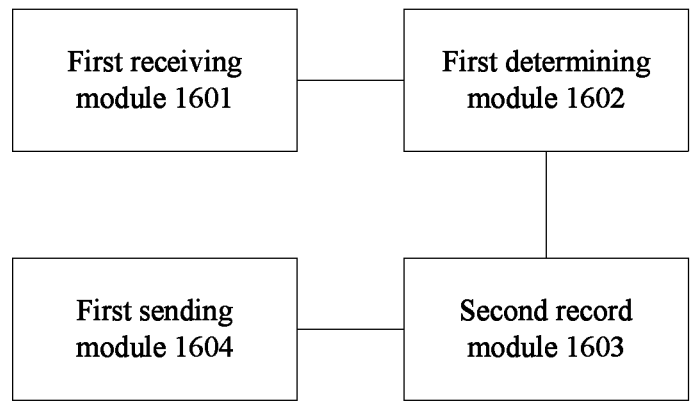
FIG. 16 is a schematic structural diagram 4 of a wearable device according to an embodiment of this application.

FIG. 16 is a schematic structural diagram 4 of a wearable device according to an embodiment of this application. As shown in the figure, the wearable device includes:

a first receiving module 1601, configured to receive a first message from a server or another terminal, where the first message includes web page address information;

a first determining module 1602, configured to detect that a user chooses to view the first message;

a second record module 1603, configured to record a second moment at which the first determining module 1602 detects that the user chooses to view the first message; and a first sending module 1604, configured to send the first message and a message view indication to a mobile terminal, where the message view indication includes an identification of the first message, and the first message includes the web page address information.

For an optional hardware implementation of the wearable device, reference may be made to FIG. 2 and related descriptions thereof. The first receiving module 1601 may be implemented by using the RF circuit 202 or the WiFi module 207. The first determining module 1602 may be implemented by using the processor 201. Recording the second moment by the second record module 1603 may be: recording the second moment in the memory 204 by the processor 201. The first sending module 1604 may be implemented by using the near field communication circuit 108.

For other optional implementations of the wearable device, reference may be made to an implementation of the wearable device 20 in the procedure shown in FIG. 8.

Figure 17:
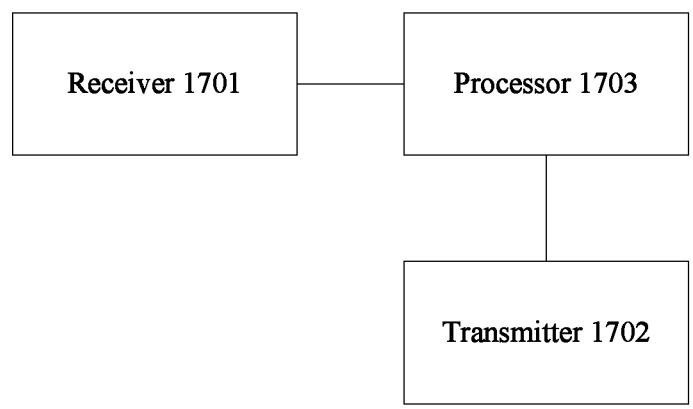
FIG. 17 is a schematic structural diagram 5 of a mobile terminal according to an embodiment of this application.

FIG. 17 is a schematic structural diagram 5 of a mobile terminal according to an embodiment of this application. As shown in the figure, the mobile terminal includes:

a receiver 1701, configured to receive a first message from a server or another terminal, where the first message includes web page address information;

a transmitter 1702, configured to send a message notification to a wearable device bound to the mobile terminal, where the message notification includes the web page address information, where the receiver 1701 is configured to receive a message view indication from the wearable device, where the message view indication includes an identification of the first message, and that a user has chosen, according to the message notification, to view the first message is determined according to the message view indication, and the receiver 1701 is further configured to obtain web page content corresponding to the web page address information; and a processor 1703, further configured to change the obtained web page content, so that the changed content is suitable to be displayed on a display screen of the wearable device, where the transmitter 1702 is further configured to send the changed web page content to the wearable device.

For an optional hardware implementation of the mobile terminal, reference may be made to FIG. 1 and related descriptions thereof. The receiver 1701 may receive the first message or the web page content by using the RF circuit 102 or the WiFi module 103. The receiver 1701 may receive the message view indication by using the near field communication circuit 108. The processor 1703 may be the processor 201. The transmitter 1702 may send the message notification and the web page content to the wearable device by using the near field communication circuit 108.

For other optional implementations of the mobile terminal, reference may be made to an implementation of the mobile terminal 10 in the procedure shown in FIG. 7.

Figure 18:
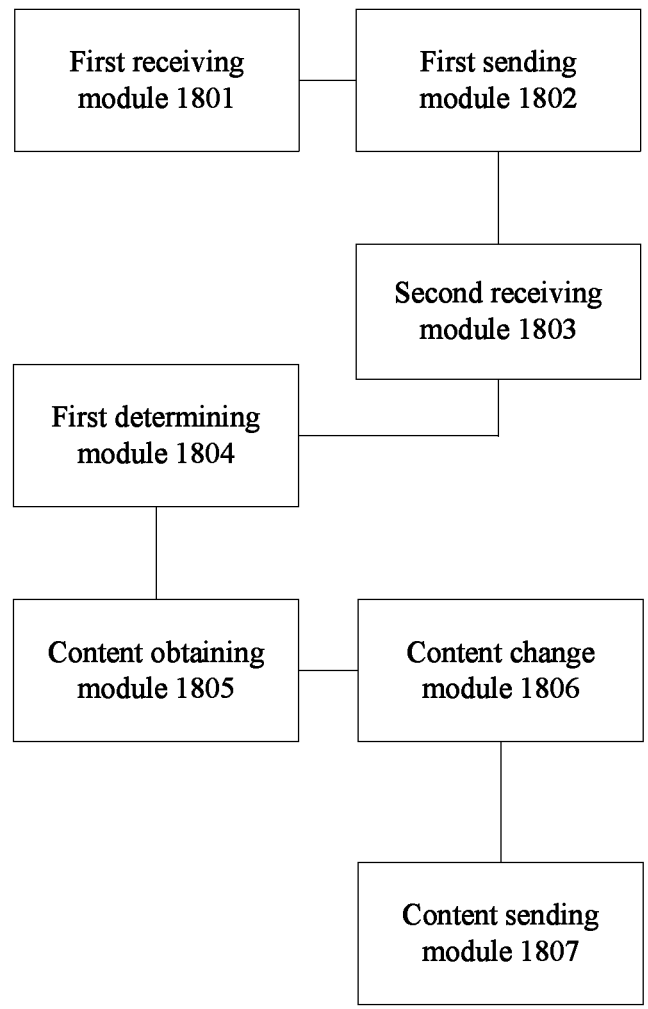
FIG. 18 is a schematic structural diagram 6 of a mobile terminal according to an embodiment of this application.

FIG. 18 is a schematic structural diagram 6 of a mobile terminal according to an embodiment of this application. As shown in the figure, the mobile terminal includes:

a first receiving module 1801, configured to receive a first message from a server or another terminal, where the first message includes web page address information;

a first sending module 1802, configured to send a message notification to a wearable device bound to the mobile terminal, where the message notification includes the web page address information;

a second receiving module 1803, configured to receive a message view indication from the wearable device, where the message view indication includes an identification of the first message;

a first determining module 1804, configured to determine, according to the message view indication, that a user has chosen, according to the message notification, to view the first message;

a content obtaining module 1805, configured to obtain web page content corresponding to the web page address information;

a content change module 1806, configured to change the obtained web page content, so that the changed content is suitable to be displayed on a display screen of the wearable device; and a content sending module 1807, configured to send the changed web page content to the wearable device.

For an optional hardware implementation of the mobile terminal, reference may be made to FIG. 1 and related descriptions thereof. The first receiving module 1801 may be implemented by using the RF circuit 102 or the WiFi module 103. The first sending module 1802 may be implemented by using the near field communication circuit 108. The second receiving module 1803 may be implemented by using the near field communication circuit 108. The first determining module 1804 may be implemented by using the processor 101. Obtaining the web page content by the content obtaining module 1805 may be: sending, by using the RF circuit 102 or the WiFi module 103, a request for the web page content to an application server corresponding to a web page, and receiving, by using the RF circuit 102 or the WiFi module 103, the web page content sent by the application server. The content change module 1806 may be implemented by using the processor 101. The content sending module 1807 may be implemented by using the near field communication circuit 108.

For other optional implementations of the mobile terminal, reference may be made to an implementation of the mobile terminal 10 in the procedure shown in FIG. 7.

Figure 19:
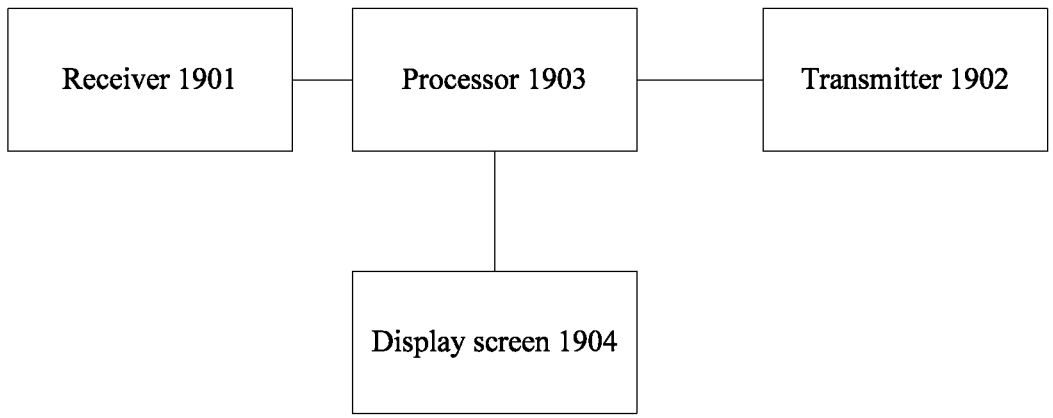
FIG. 19 is a schematic structural diagram 5 of a wearable device according to an embodiment of this application.

FIG. 19 is a schematic structural diagram 5 of a wearable device according to an embodiment of this application. As shown in the figure, the wearable device includes:

a receiver 1901, configured to receive a message notification from a mobile terminal bound to the wearable device, where the message notification includes web page address information and an identification of a first message, and the web page address information is included in the first message received by the mobile terminal;

a display screen 1904, configured to display the message notification;

a processor 1903, configured to detect that a user has chosen, according to the message notification, to view the first message;

a transmitter 1902, configured to: when the processor detects that the user has chosen, according to the message notification, to view the first message, send a message view indication to the mobile terminal, where the message view indication includes an identification of the first message, where the receiver 1901 is further configured to receive web page content from the mobile terminal, where the web page content has been changed by the mobile terminal and is suitable to be displayed on the display screen of the wearable device, and the display screen 1904 is further configured to display the web page content.

For an optional hardware implementation of the wearable device, reference may be made to FIG. 2 and related descriptions thereof. The receiver 1901 may be the near field communication circuit 210. The display screen 1904 may be the display screen 203. The processor 1903 may be the processor 201. The transmitter 1902 may be the near field communication circuit 210.

For other optional implementations of the wearable device, reference may be made to an implementation of the wearable device 20 in the procedure shown in FIG. 7.

Figure 20:
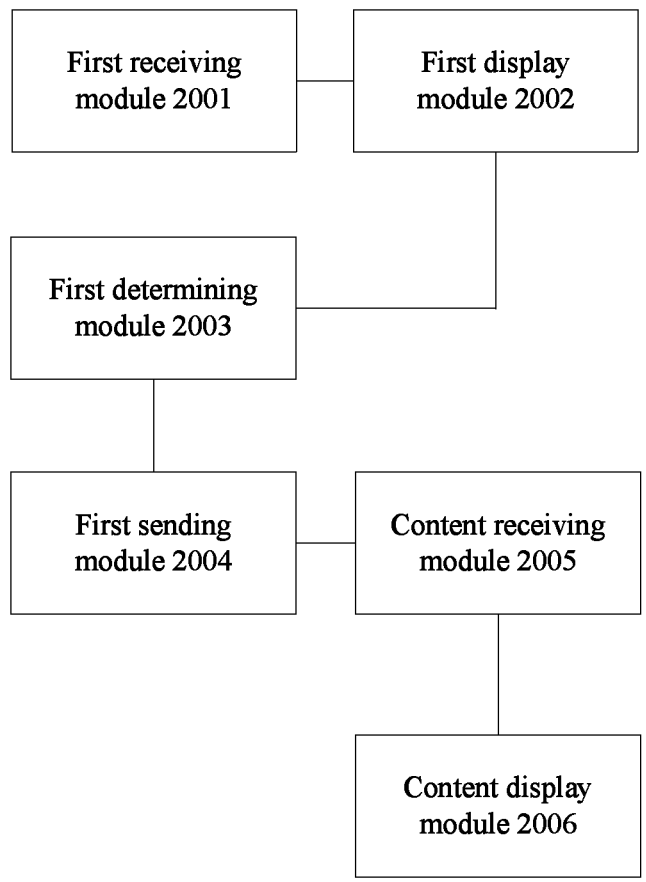
FIG. 20 is a schematic structural diagram 6 of a wearable device according to an embodiment of this application.

FIG. 20 is a schematic structural diagram 6 of a wearable device according to an embodiment of this application. As shown in the figure, the wearable device includes:

a first receiving module 2001, configured to receive a message notification from a mobile terminal bound to the wearable device, where the message notification includes web page address information and an identification of a first message, and the web page address information is included in the first message received by the mobile terminal;

a first display module 2002, configured to display the message notification on a display screen of the wearable device;

a first determining module 2003, configured to detect that a user has chosen, according to the message notification, to view the first message;

a first sending module 2004, configured to send a message view indication to the mobile terminal, where the message view indication includes the identification of the first message;

a content receiving module 2005, configured to receive web page content from the mobile terminal, where the web page content has been changed by the mobile terminal and is suitable to be displayed on the display screen of the wearable device; and a content display module 2006, configured to display the web page content on the display screen of the wearable device.

For an optional hardware implementation of the wearable device, reference may be made to FIG. 2. The first receiving module 2001 may be implemented by using the near field communication circuit 210. The first display module 2002 may be implemented by using the display screen 203. The first determining module 2003 may be implemented by using the processor 201. The first sending module 2004 may be implemented by using the near field communication circuit 210. The content receiving module 2005 may be implemented by using the near field communication circuit 210. The content display module 2006 may be implemented by using the display screen 203.

For other optional implementations of the wearable device, reference may be made to an implementation of the wearable device 20 in the procedure shown in FIG. 7.

To sum up, according to the message transfer method, the wearable device, and the mobile terminal provided in this application, web page content can be displayed.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, persons skilled in the art can make various modifications and variations to the embodiments of this application without departing from the spirit and scope of the embodiments of the present invention. This application is intended to cover these modifications and variations provided that they fall within the scope of protection defined by the following claims and their equivalent technologies.

What is claimed is:

1. A message transfer method executed by a mobile terminal, the method comprising:
   receiving a first message from a server or another terminal, wherein the first message comprises web page address information;
   sending a message notification to a wearable device paired with the mobile terminal, wherein the message notification comprises the web page address information;
   detecting that the mobile terminal is used, and recording a first moment at which use of the mobile terminal is detected;
   receiving a message view indication sent by the wearable device paired with the mobile terminal, wherein the message view indication comprises an identification of the first message;
   determining, according to the message view indication, that a user has chosen, according to the message notification, to view the first message;
   determining whether a time interval between a second moment and the first moment is less than a time interval threshold, wherein the second moment is a moment at which the user chooses, according to the message notification, to view the first message;
   when determining that the time interval between the second moment and the first moment is less than the time interval threshold, obtaining web page content corresponding to the web page address information; and
   displaying the web page content.

2. The method according to claim 1, wherein:
   the message notification comprises the identification of the first message, and
   determining, according to the message view indication, that a user has chosen, according to the message notification, to view the first message comprises:
     when the message view indication comprises the identification of the first message, determining that the user has chosen, according to the message notification, to view the first message.

3. The method according to claim 1, wherein:
   after detecting that the mobile terminal is used, and before receiving a message view indication sent by the wearable device paired with the mobile terminal, the method further comprises:
     sending a first query message to the wearable device, wherein the first query message comprises the identification of the first message; and
   receiving a message view indication sent by the wearable device paired with the mobile terminal comprises:
     receiving the message view indication sent by the wearable device according to the first query message.

4. The method according to claim 1, further comprising:
recording a moment at which the mobile terminal receives the message view indication, and using the moment at which the mobile terminal receives the message view indication, as the second moment.

5. The method according to claim 1, wherein:
the message view indication further comprises a moment at which the wearable device detects that the user chooses to view the first message; and
the method further comprises: using the moment at which the wearable device detects that the user chooses to view the first message, as the second moment.

6. The method according to claim 1, wherein:
after detecting that the mobile terminal is used, the method further comprises:
sending a second query message to the wearable device, wherein the second query message comprises information about the first moment; and
before determining whether a time interval between a second moment and the first moment is less than a time interval threshold, the method further comprises:
receiving a result determined by the wearable device that the time interval between the second moment and, the first moment is less than the time interval threshold, wherein the second moment is a moment at which the wearable device detects that the user chooses to view the first message.

7. A message transfer method executed by a wearable device, the method comprising:
receiving a message notification from a mobile terminal paired with the wearable device, wherein the message notification comprises web page address information and an identification of a first message, and wherein the web page address information is comprised in the first message received by the mobile terminal;
displaying the message notification on a display screen of the wearable device;
detecting that a user chooses, according to the message notification, to view the first message, and recording a second moment at which the user chooses to view the first message is detected;
receiving a second query message sent by the mobile terminal, wherein the second query message comprises information about a first moment at which the mobile terminal detects the mobile terminal is used;
determining whether a time interval between the first moment and the second moment is less than a time interval threshold; and
when the time interval is less than the time interval threshold, sending the message view indication to the mobile terminal, wherein the message view indication comprises the identification of the first message.

8. The method according to claim 7, wherein, when the time interval between the first moment and the second moment is less than the time interval threshold, the method further comprises:
sending, to the mobile terminal, a result of determining that the time interval between the second moment and the first moment is less than the time interval threshold.

9. A mobile terminal, comprising:
a receiver, configured to receive a first message from a server or another terminal, wherein the first message comprises web page address information;
a transmitter, configured to send a message notification to a wearable device paired with the mobile terminal, wherein the message notification comprises the web page address information;
a processor, configured to: detect that the mobile terminal is used, and record a first moment at which use of the mobile terminal is detected;
the receiver is configured to receive a message view indication sent by the wearable device paired with the mobile terminal, wherein the message view indication comprises an identification of the first message;
the processor is further configured to determine, according to the message view indication, that a user has chosen, according to the message notification, to view the first message;
the processor is further configured to determine whether a time interval between a second moment and the first moment is less than a time interval threshold, wherein the second moment is a moment at which the user chooses, according to the message notification, to view the first message; and
the receiver is further configured to: when the processor determines that the time interval between the second moment and the first moment is less than the time interval threshold, obtain web page content corresponding to the web page address information; and
a display, configured to display the web page content obtained by the receiver.

10. The mobile terminal according to claim 9, wherein:
the message notification comprises the identification of the first message; and
the processor is configured to: when the message view indication comprises the identification of the first message, determine that the user has chosen, according to the message notification, to view the first message.

11. The mobile terminal according to claim 9, wherein:
the transmitter is further configured to: after the processor detects that the mobile terminal is used, and before the receiver receives the message view indication sent by the wearable device paired with the mobile terminal, send a first query message to the wearable device, wherein the first query message comprises the identification of the first message; and
the receiver is configured to receive the message view indication sent by the wearable device according to the first query message.

12. The mobile terminal according to claim 9, wherein the processor is further configured to:
record a moment at which the mobile terminal receives the message view indication, and use the moment at which the mobile terminal receives the message view indication, as the second moment.

13. The mobile terminal according to claim 9, wherein:
the message view indication further comprises a moment at which the wearable device detects that the user chooses to view the first message; and
the processor is further configured to use the moment at which the wearable device detects that the user chooses to view the first message, as the second moment.

14. The mobile terminal according to claim 9, wherein:
the transmitter is further configured to: after the processor detects that the mobile terminal is used, send a second query message to the wearable device, wherein the second query message comprises information about the first moment; and
the receiver is further configured to: before the processor determines whether the time interval between the second moment and the first moment is less than the time interval threshold, receive a result determined by the wearable device that the time interval between the second moment and the first moment is less than the time interval threshold, wherein the second moment is a moment at which the wearable device detects that the user chooses to view the first message.

\* \* \* \* \*